(12) United States Patent
Kruger

(10) Patent No.: US 8,187,444 B2
(45) Date of Patent: May 29, 2012

(54) FLUID TREATMENT DEVICE

(76) Inventor: Eric John Kruger, Erie, PA (US)

( * ) Notice: Subject to any disclaimer, the term of this patent is extended or adjusted under 35 U.S.C. 154(b) by 1285 days.

(21) Appl. No.: 11/837,225

(22) Filed: Aug. 10, 2007

(65) Prior Publication Data

US 2009/0038944 A1    Feb. 12, 2009

Related U.S. Application Data

(60) Provisional application No. 60/955,253, filed on Aug. 10, 2007, provisional application No. 60/955,244, filed on Aug. 10, 2007.

(51) Int. Cl.
*B01D 35/06* (2006.01)

(52) U.S. Cl. .................. 204/663; 204/228.6; 204/229.5; 204/230.6; 422/82.02

(58) Field of Classification Search .................. 204/555, 204/228.6, 229.5, 230.6; 205/789.5; 210/746, 210/739; 422/82.02
See application file for complete search history.

(56) References Cited

U.S. PATENT DOCUMENTS

| | | |
|---|---|---|
| 2,097,431 A | 11/1937 | Partridge et al. |
| 2,539,305 A | 1/1951 | Hatch |
| 2,640,026 A | 5/1953 | Whittington |
| 3,177,899 A | 4/1965 | Anderson et al. |
| 3,469,696 A | 9/1969 | Petrucci et al. |
| 3,679,565 A | 7/1972 | Gilchrist |
| 3,692,179 A | 9/1972 | Moore |
| 3,794,169 A | 2/1974 | Sisk et al. |
| 3,805,880 A | 4/1974 | Lawlar |
| 3,843,507 A | 10/1974 | Kwan |
| 3,891,394 A | 6/1975 | Smith et al. |
| 3,923,629 A | 12/1975 | Shaffer |
| 3,933,606 A | 1/1976 | Harms |
| 3,936,376 A | 2/1976 | Centineo |
| 3,951,807 A | 4/1976 | Sanderson |
| 3,974,071 A | 8/1976 | Dunn et al. |
| 3,990,968 A | 11/1976 | Oesterle |
| 3,992,301 A | 11/1976 | Shippey et al. |
| 4,050,426 A | 9/1977 | Sanderson |
| 4,153,559 A | 5/1979 | Sanderson |
| 4,188,278 A | 2/1980 | Reis et al. |
| 4,216,092 A | 8/1980 | Shalhoob et al. |
| 4,235,698 A | 11/1980 | Arnaud |
| 4,299,700 A | 11/1981 | Sanderson |

(Continued)

FOREIGN PATENT DOCUMENTS

DE           4229740         10/1994

(Continued)

OTHER PUBLICATIONS

Various press releases from Global Water Technologies, Inc. on their website www.gwtr.com/news (dated from Jan. 18, 1999 through May 17, 2007).

(Continued)

*Primary Examiner* — J. Christopher Ball
(74) *Attorney, Agent, or Firm* — Faegre Baker Daniels

(57) ABSTRACT

A fluid treatment device is disclosed. The fluid treatment device includes at least a first electrode and a second electrode in direct contact with the fluid. The fluid treatment device may include a control device which adjusts a parameter of an alternating potential difference provided between the first electrode and the second electrode based on the indication of the conductivity between the first electrode and the second electrode.

7 Claims, 18 Drawing Sheets

U.S. PATENT DOCUMENTS

| | | | |
|---|---|---|---|
| 4,320,003 A | 3/1982 | Sanderson et al. | |
| 4,326,954 A | 4/1982 | Shroyer | |
| 4,357,237 A | 11/1982 | Sanderson | |
| 4,419,240 A | 12/1983 | Rosaen | |
| 4,430,785 A | 2/1984 | Sanderson | |
| 4,455,229 A | 6/1984 | Sanderson et al. | |
| 4,460,008 A | 7/1984 | O'Leary et al. | |
| 4,496,459 A | 1/1985 | Rosaen | |
| 4,574,047 A | 3/1986 | Rosaen | |
| 4,629,568 A | 12/1986 | Ellis, III | |
| 4,648,043 A | 3/1987 | O'Leary | |
| 4,651,570 A | 3/1987 | Rosaen | |
| 4,701,259 A | 10/1987 | Rosaen | |
| 4,784,771 A | 11/1988 | Wathen et al. | |
| 4,789,448 A | 12/1988 | Woodhouse | |
| 4,820,422 A | 4/1989 | Spencer | |
| 4,861,489 A | 8/1989 | Swift et al. | |
| 4,865,748 A | 9/1989 | Morse | |
| 4,889,041 A | 12/1989 | Mahlich et al. | |
| 4,931,187 A | 6/1990 | Derham et al. | |
| 4,963,268 A | 10/1990 | Morse | |
| 4,966,697 A | 10/1990 | Rosaen | |
| 4,970,004 A | 11/1990 | Rosaen | |
| 4,981,594 A | 1/1991 | Jones | |
| 5,007,994 A | 4/1991 | Snee | |
| 5,043,063 A | 8/1991 | Latimer | |
| 5,106,491 A | 4/1992 | Schulze et al. | |
| 5,128,032 A | 7/1992 | Rosaen | |
| 5,145,585 A | 9/1992 | Coke | |
| 5,176,826 A | 1/1993 | Rosaen | |
| 5,188,738 A | 2/1993 | Kaali et al. | |
| 5,204,006 A | 4/1993 | Santoli | |
| 5,282,972 A | 2/1994 | Hanna et al. | |
| 5,304,302 A | 4/1994 | Bossert | |
| 5,314,623 A | 5/1994 | Heskett | |
| 5,324,398 A * | 6/1994 | Erickson et al. | 205/701 |
| 5,326,446 A | 7/1994 | Binger | |
| 5,354,515 A | 10/1994 | Ushimaru | |
| 5,423,962 A | 6/1995 | Herbst | |
| 5,427,667 A | 6/1995 | Bakhir et al. | |
| 5,433,856 A | 7/1995 | Heskett | |
| 5,458,758 A * | 10/1995 | Suchacz | 204/272 |
| 5,462,678 A | 10/1995 | Rosaen | |
| 5,480,564 A | 1/1996 | Pope et al. | |
| 5,520,816 A | 5/1996 | Kuepper | |
| 5,549,812 A | 8/1996 | Witt a.k.a. Witte | |
| 5,611,907 A | 3/1997 | Herbst et al. | |
| 5,643,444 A | 7/1997 | Garrigues et al. | |
| 5,670,041 A | 9/1997 | Cho et al. | |
| 5,710,536 A | 1/1998 | Fastman | |
| 5,725,778 A | 3/1998 | Cho et al. | |
| 5,776,334 A | 7/1998 | Cho | |
| 5,837,134 A | 11/1998 | Heskett | |
| 5,846,414 A | 12/1998 | Cho | |
| 5,882,530 A | 3/1999 | Chase | |
| 5,891,334 A | 4/1999 | Gundrum et al. | |
| 5,916,490 A | 6/1999 | Cho | |
| 5,951,856 A | 9/1999 | Cho | |
| 5,990,684 A | 11/1999 | Merrill | |
| 6,113,779 A | 9/2000 | Snee | |
| 6,120,688 A | 9/2000 | Daly et al. | |
| 6,203,710 B1 | 3/2001 | Woodbridge | |
| 6,217,773 B1 | 4/2001 | Graham | |
| 6,232,783 B1 | 5/2001 | Merrill | |
| 6,238,546 B1 | 5/2001 | Knieper et al. | |
| 6,258,250 B1 | 7/2001 | Weissenbacher et al. | |
| 6,270,664 B1 | 8/2001 | Tsabari | |
| 6,292,085 B1 | 9/2001 | Cho | |
| 6,295,411 B1 | 9/2001 | Fastman | |
| 6,325,942 B1 | 12/2001 | Freije, III | |
| 6,346,180 B1 | 2/2002 | Gonzalez et al. | |
| 6,365,023 B1 | 4/2002 | De Los Reyes et al. | |
| 6,379,518 B1 | 4/2002 | Osawa et al. | |
| 6,383,391 B1 | 5/2002 | Ehrenberg et al. | |
| 6,398,928 B1 | 6/2002 | Koganezawa et al. | |
| 6,402,920 B1 | 6/2002 | Sato et al. | |
| 6,413,298 B1 | 7/2002 | Wnek et al. | |
| 6,416,668 B1 | 7/2002 | Al-Samadi | |
| 6,553,894 B1 | 4/2003 | Hamon et al. | |
| 6,558,537 B1 | 5/2003 | Herrington et al. | |
| 6,609,070 B1 | 8/2003 | Lueck | |
| 6,609,564 B2 | 8/2003 | Imaoka et al. | |
| 6,613,233 B1 | 9/2003 | Rusk et al. | |
| 6,641,727 B1 | 11/2003 | Aldred et al. | |
| 6,652,758 B2 | 11/2003 | Krulik | |
| 6,689,270 B1 | 2/2004 | Evert | |
| 6,709,599 B1 | 3/2004 | Rosenberger et al. | |
| 6,733,654 B1 | 5/2004 | Itzhak | |
| 6,773,588 B2 | 8/2004 | Beeman et al. | |
| 6,821,428 B1 | 11/2004 | Zeiher et al. | |
| 6,838,001 B2 | 1/2005 | Zeiher et al. | |
| 6,849,178 B2 | 2/2005 | Hecking | |
| 6,855,233 B2 | 2/2005 | Sawada | |
| 6,855,257 B2 | 2/2005 | Bonds et al. | |
| 6,863,822 B2 | 3/2005 | Pipes | |
| 7,015,119 B2 | 3/2006 | Takahashi et al. | |
| 7,045,063 B2 | 5/2006 | Zhang et al. | |
| 7,052,600 B2 | 5/2006 | McKay | |
| 7,077,962 B2 | 7/2006 | Pipes | |
| 7,083,730 B2 | 8/2006 | Davis | |
| 7,144,513 B2 | 12/2006 | Sher et al. | |
| 7,229,555 B1 | 6/2007 | Edinger | |
| 7,244,360 B2 | 7/2007 | Cho | |
| 7,377,291 B2 | 5/2008 | Moon et al. | |
| 7,497,953 B2 | 3/2009 | Dart et al. | |
| 2003/0041608 A1 | 3/2003 | Gonzalez-Cruz et al. | |
| 2003/0127398 A1 | 7/2003 | Bartl et al. | |
| 2004/0031697 A1 | 2/2004 | Breault | |
| 2004/0206680 A1 | 10/2004 | Johnson | |
| 2004/0238453 A1 | 12/2004 | Cho | |
| 2004/0254682 A1 | 12/2004 | Kast | |
| 2005/0173242 A1 | 8/2005 | Elgressy | |
| 2005/0183964 A1 | 8/2005 | Roberts et al. | |
| 2005/0242036 A1 | 11/2005 | Harris | |
| 2005/0252864 A1 | 11/2005 | Keller et al. | |
| 2005/0263386 A9 | 12/2005 | Pitts, Jr. et al. | |
| 2005/0263457 A1 | 12/2005 | Wilkins et al. | |
| 2006/0137996 A1 | 6/2006 | Mierswa | |
| 2006/0138031 A1 | 6/2006 | Kloos et al. | |
| 2006/0144700 A1 | 7/2006 | Carson et al. | |
| 2006/0175200 A1 | 8/2006 | Holland | |
| 2007/0227980 A1 | 10/2007 | Cho | |
| 2008/0029252 A1 | 2/2008 | Freije et al. | |
| 2008/0105621 A1 | 5/2008 | Johnson et al. | |
| 2009/0038944 A1 | 2/2009 | Kruger | |

FOREIGN PATENT DOCUMENTS

| | | |
|---|---|---|
| DE | 196 02 369 A1 | 7/1997 |
| EP | 0 338 896 A1 | 4/1989 |
| EP | 1558527 | 5/2007 |
| EP | 2039656 | 3/2009 |
| GB | 2291365 | 1/1996 |
| WO | WO 98/31636 | 7/1998 |
| WO | WO 03/040043 | 5/2003 |
| WO | WO 2004/041728 | 5/2004 |
| WO | WO 2006/039873 | 4/2006 |
| WO | WO 2008/016934 | 2/2008 |
| WO | WO 2009/023186 A2 | 2/2009 |
| WO | WO 2009-023187 A2 | 2/2009 |

OTHER PUBLICATIONS

International Search Report of the International Searching Authority for PCT/US2008/009620, 6 pages.

International Search Report of the International Searching Authority for PCT/US2008/009621, 7 pages.

"Welcome to Dime Water, Inc." press release, Aug. 2008, also available at http://www.dimewater.com/index.html, 3 pages.

International Search Report and the Written Opinion of the International Searching Authority for PCT/US2008/009620, 12 pages.

International Search Report and the Written Opinion of the International Searching Authority for PCT/US2008/009621, 9 pages.

* cited by examiner

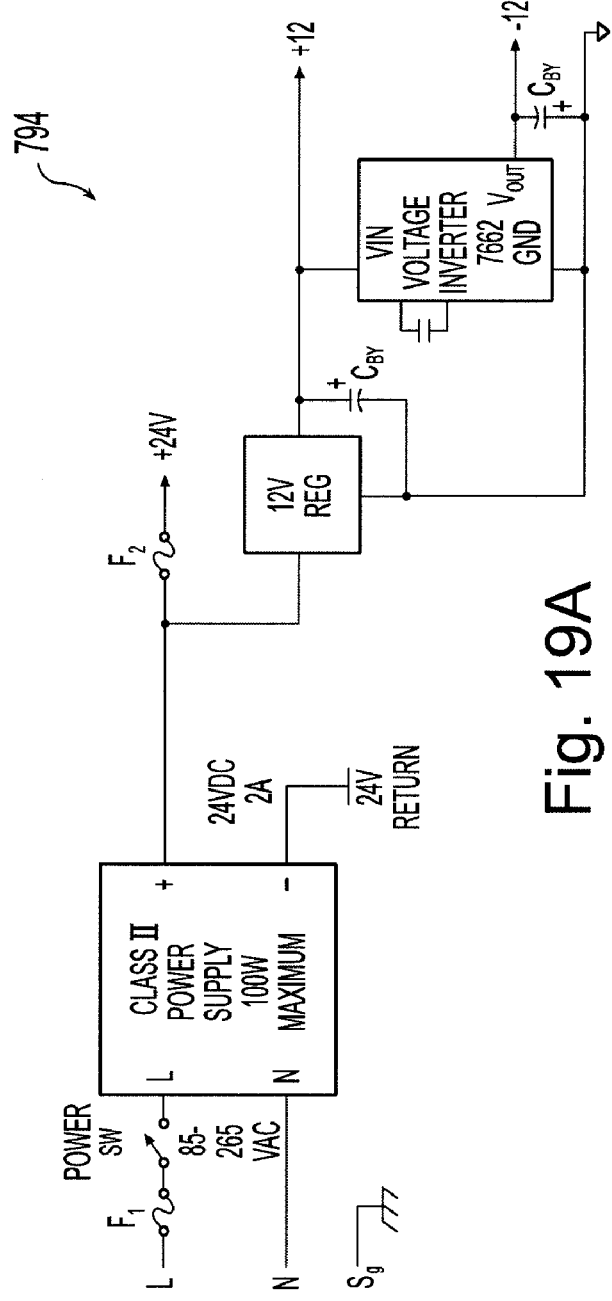
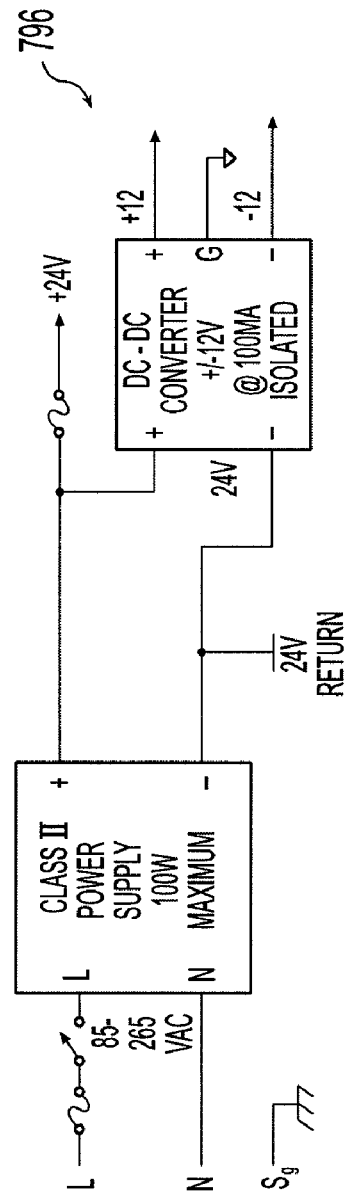
Fig. 19A
Fig. 19B

FLUID TREATMENT DEVICE

CROSS REFERENCE TO RELATED APPLICATIONS

This application is related to U.S. Provisional Patent Application Ser. No. 60/955,253, filed Aug. 10, 2007, titled "METHOD AND APPARATUS FOR TREATING A FLUID", and U.S. Provisional Patent Application Ser. No. 60/955,244, filed Aug. 10, 2007, titled "METHOD AND APPARATUS FOR TREATING A FLUID", the disclosures of which are expressly incorporated by reference herein.

BACKGROUND AND SUMMARY OF THE INVENTION

The present invention relates generally to methods and apparatus for the treatment of a fluid and more particularly to methods and apparatus to treat a water based fluid.

It is known to reduce scale in a water based fluid by wrapping a pipe transporting the water based fluid with a wire having an alternating current passing there through. An exemplary system is the EasyWater™ brand water treatment system available from Freije Treatment Systems located at 7435 E. 86th Street, Indianapolis, Ind. 46256. Further, it is known to place electrodes in direct contact with a water based fluid as disclosed in U.S. patent application Ser. No. 10/493,094, assigned to Drexel University, the disclosure of which is expressly incorporated by reference herein.

In an exemplary embodiment of the present disclosure, a fluid treatment device for treating a water based fluid is provided. The fluid treatment device comprising a conduit through which the water based fluid travels; at least a first electrode and a second electrode placed in direct contact with the water based fluid; and a control device coupled to the at least two electrodes. The control device providing an alternating potential difference between the first electrode and the second electrode and monitoring a conductivity between the first electrode and the second electrode. At least one characteristic of the alternating potential difference being adjusted by the control device based on an indication of the conductivity between the first electrode and the second electrode.

In a further exemplary embodiment of the present disclosure, a fluid treatment device for treating a water based fluid is provided. The fluid treatment device comprising a conduit through which the water based fluid travels; at least a first electrode and a second electrode placed in direct contact with the water based fluid; and a control device coupled to the at least two electrodes to provide an alternating potential difference between the first electrode and the second electrode. A period of the alternating potential difference being adjusted by the control device to enhance resonance in the water based fluid.

In another exemplary embodiment of the present disclosure, a fluid treatment device for treating a fluid is provided. The fluid treatment device comprising a conduit having an interior through which the fluid travels; at least a first electrode and a second electrode placed in direct contact with the fluid within the conduit; and a control device coupled to the first electrode and the second electrode to provide a potential difference between the first electrode and the second electrode. Each of the first electrode and the second electrode include at least a first fluid directing surface positioned relative to the conduit to direct the fluid traveling through the conduit between the first electrode and the second electrode.

In still another exemplary embodiment of the present disclosure, a fluid treatment device for treating a water based fluid is provided. The fluid treatment device comprising a conduit through which the water based fluid travels; at least a first electrode and a second electrode placed in direct contact with the water based fluid; a control device coupled to the at least two electrodes. The control device providing an alternating potential difference between the first electrode and the second electrode and monitoring a conductivity between the first electrode and the second electrode. A peak voltage of the alternating potential difference between the first electrode and the second electrode and a duty cycle of the alternating potential difference being adjusted by the control device based on an indication of the conductivity between the first electrode and the second electrode.

In yet another exemplary embodiment of the present disclosure, a method of treating a moving fluid is provided. The method comprising the steps of providing a first electrode and a second electrode each in direct contact with the moving fluid, the moving fluid passing between the first electrode and the second electrode; applying an alternating potential difference between the first electrode and the second electrode to treat the moving fluid; monitoring an indication of a conductivity between the first electrode and the second electrode; and adjusting a parameter of the alternating potential difference based on the indication of the conductivity between the first electrode and the second electrode.

Additional features and advantages will become apparent to those skilled in the art upon consideration of the following detailed description of illustrative embodiments exemplifying the best mode of carrying out the invention as presently perceived.

BRIEF DESCRIPTION OF THE DRAWINGS

The detailed description of the drawings particularly refers to the accompanying figures in which:

FIGS. 14-19 illustrate another exemplary embodiment of the control unit of FIG. 8.

DETAILED DESCRIPTION OF THE DRAWINGS

The embodiments of the invention described herein are not intended to be exhaustive or to limit the invention to the precise forms disclosed. Rather, the embodiments selected for description have been chosen to enable one skilled in the art to practice the invention.

Figure 1:
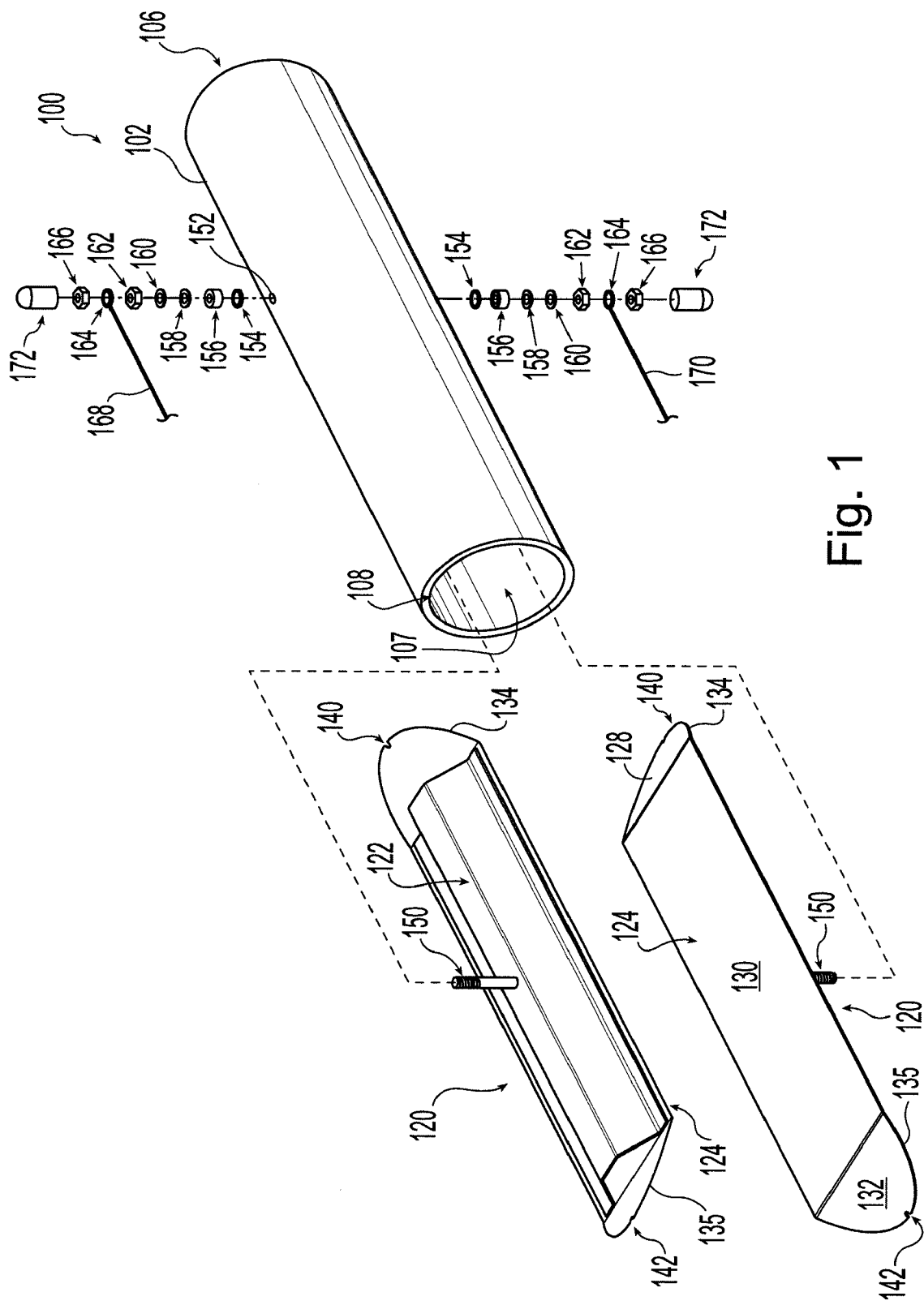
FIG. 1 illustrates an exploded assembly view of an exemplary treatment device.
Figure 2:
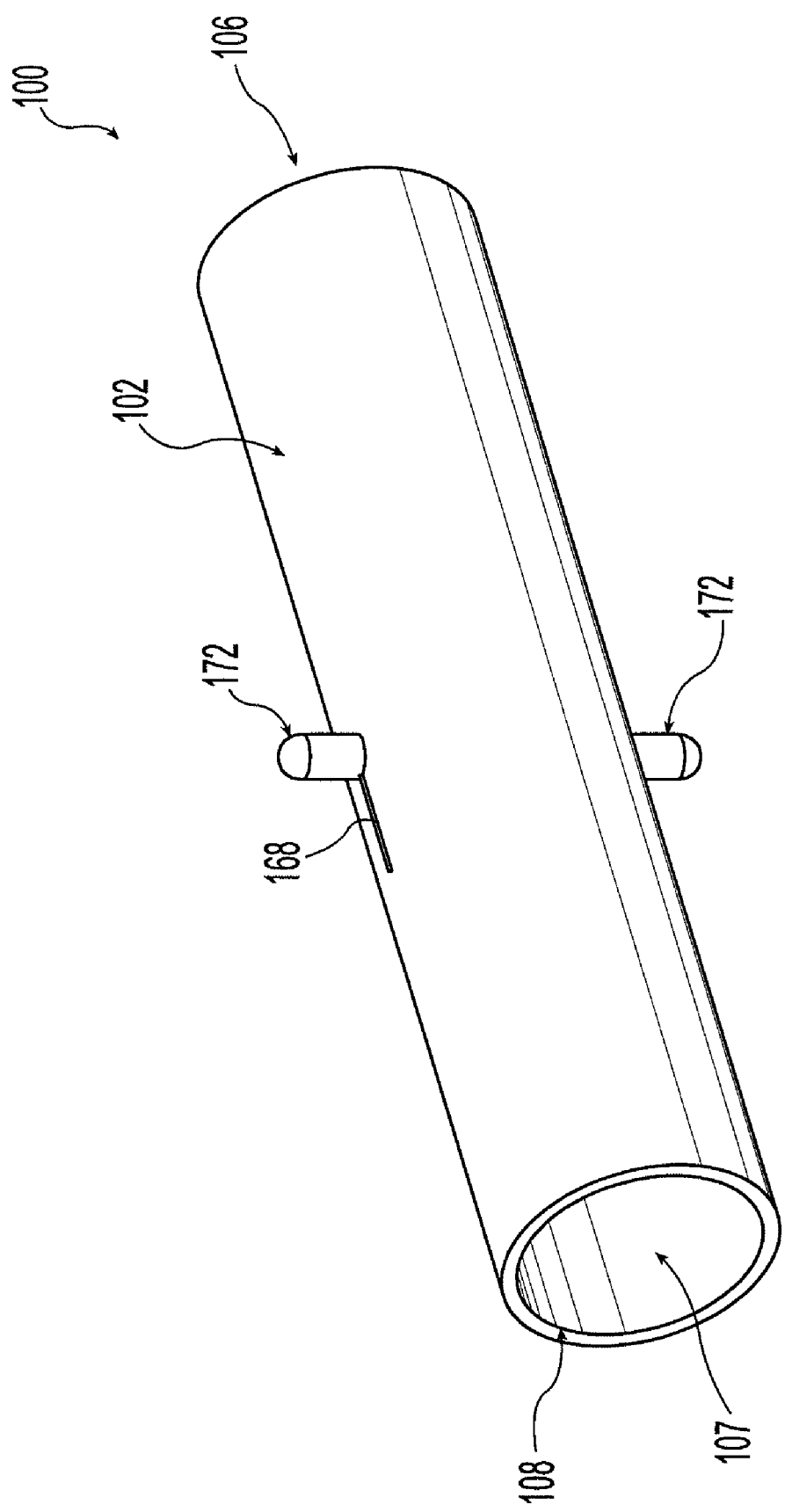
FIG. 2 illustrates the exemplary treatment device of FIG. 1 assembled.

Referring to FIG. 1, a treatment device 100 is shown. Treatment device 100 includes a conduit 102 for fluid 104 (see FIG. 4) to pass through. In one embodiment, conduit 102 is a non-conducting conduit. Exemplary non-conductive conduits include PVC pipe. Fluid 104 enters a first end 106 of conduit 102, passes through an interior 107 of conduit 102 and exits a second end 108 of conduit 102. While passing through interior 107 at least a portion of the fluid flows through an area 110 (see FIG. 3) between a pair of electrodes 120.

Each electrode of the pair of electrodes 120 includes a support 122, a face member 124, and a coupler 126. Face member 124 includes a first fluid directing surface 128, a main treatment surface 130, and a second fluid directing surface 132. In one embodiment, first fluid directing surface 128, main treatment surface 130, and second fluid directing surface 132 are each generally flat. In one example, first fluid directing surface 128 and second fluid directing surface 132 each are angled away from main treatment surface 130 by about 30°. In one embodiment, first fluid directing surface 128 and second fluid directing surface 132 are bent at an angle greater than a perfect fit with profile 133 of conduit 102 (see FIG. 3) to ensure that profiles 134 and 135 (see FIG. 1) of fluid directing surfaces 128 and 132, respectively, contact conduit 102.

Electrodes 120 may have any suitable shape. Exemplary electrodes are provided in U.S. Provisional Patent Application Ser. No. 60/955,253, filed Aug. 10, 2007, titled "METHOD AND APPARATUS FOR TREATING A FLUID", and U.S. Provisional Patent Application Ser. No. 60/955,244, filed Aug. 10, 2007, titled "METHOD AND APPARATUS FOR TREATING A FLUID", the disclosures of which are expressly incorporated by reference herein.

Figure 3:
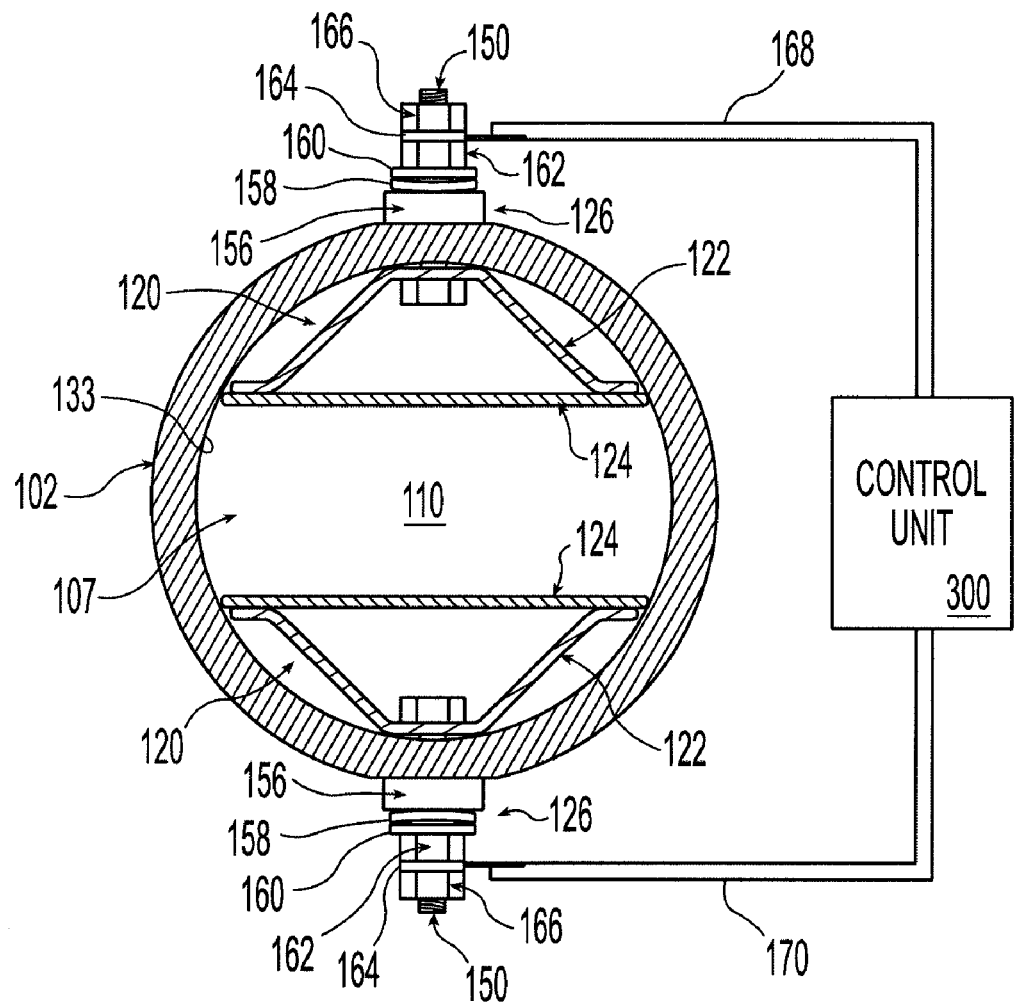
FIG. 3 illustrates a lateral sectional view of a conduit and a pair of electrodes of the treatment device of FIG. 1.
Figure 4:
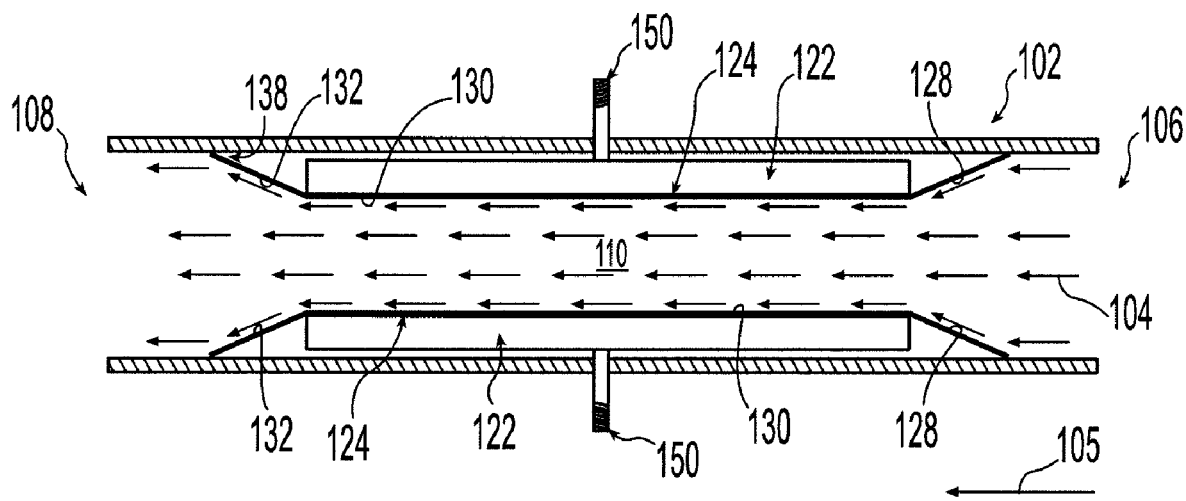
FIG. 4 illustrates a longitudinal sectional view of the conduit and the pair of electrodes of the treatment device of FIG. 1.

Referring to FIG. 4, fluid 104 flows generally in direction 105. Fluid 104 passing through a central section of conduit 102 passes generally straight on through area 110 of conduit 102. Fluid 104 flowing towards the periphery of interior 107 may encounter first fluid directing surface 128 of face member 124 whereby first fluid directing surface 128 directs fluid 104 towards area 110 so that fluid 104 passes between pair of electrodes 120. As shown in FIG. 3, a width of face member 124 is chosen to generally correspond to a profile 133 of conduit 102. Similarly, as shown in FIGS. 1 and 4, a profile 134 of first fluid directing surface 128 and a profile 135 of second fluid directing surface 132 are chosen to generally correspond to profile 133 of conduit 102 to minimize a gap 138 (see FIG. 4) between the respective first fluid directing surface 128 or second fluid directing surface 132 and conduit 102. By electrodes 120 generally matching profile 133 of conduit 102, fluid 104 generally flows through area 110 which has less resistance.

Figure 5C:
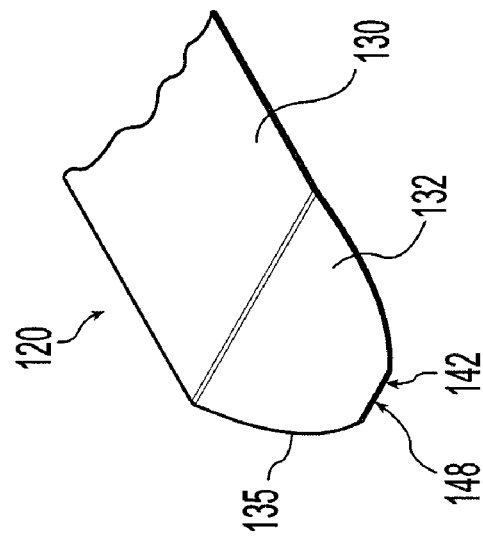
FIG. 5C illustrates a third exemplary fluid directing surface of the electrode.
Figure 5B:
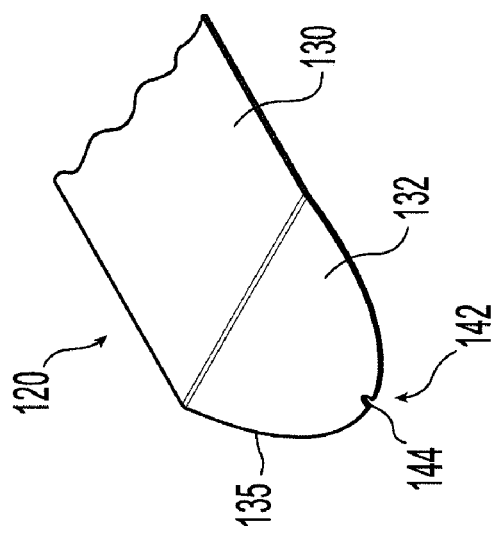
FIG. 5B illustrates a second exemplary fluid directing surface of the electrode.
Figure 5A:
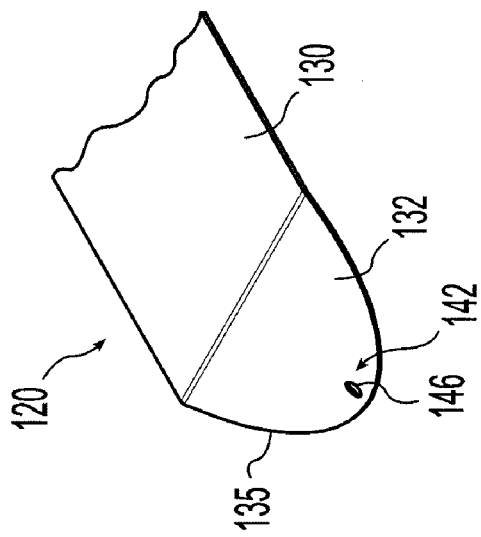
FIG. 5A illustrates a first exemplary fluid directing surface of the electrode.

Referring to FIG. 1, both first fluid directing surface 128 and second fluid directing surface 132 include a weep feature, respectively weep feature 140 and weep feature 142. As illustrated in FIG. 1 and FIG. 5B, weep feature 142 (and weep feature 140) includes a notch 144 in profile 135. Notch 144 permits fluid 104 that travels between electrodes 120 and conduit 102 to exit the space between electrodes 120 and conduit 102. Another exemplary weep feature 142 is an opening 146 in electrodes 120 as shown in FIG. 5A. Another exemplary weep feature 142 is a truncated portion 148 in electrode 120 as shown in FIG. 5C.

Returning to FIG. 1, treatment device 100 may be assembled as follows. A bolt 150 of coupler 126 (see FIG. 3) is coupled to support 122 of electrode 120. An exemplary method of coupling is welding. In one embodiment, bolt 150 is not welded to support 122, but merely captured between support 122 and face member 124. In alternative embodiments, bolt 150 is coupled to support 122 through fasteners or other suitable couplers. Face member 124 is coupled to support 122. In one embodiment, face member 124 is coupled to support 122 by welding. In alternative embodiments, face member 124 is coupled to support 122 through fasteners or other suitable couplers.

Each of electrodes 120 are placed in interior 107 of conduit 102 with the respective bolt 150 being passed through openings 152 in conduit 102. A seal 154 is placed in contact with an exterior of conduit 102 and held in place with a retainer 156. In one embodiment, seal 154 is an o-ring and retainer 156 includes a groove to receive the o-ring. Retainer 156 has a lower profile which generally corresponds with the profile of conduit 102 to keep seal 154 in contact with conduit 102. In one embodiment, conduit 102 includes a flat portion in the region around opening 152 to provide a sealing surface for seal 154.

A Bellville washer 158 and a flat washer 160 are placed next to retainer 156 followed by a nut 162. Nut 162 threadably engages bolt 150 and secures electrode 120 in the location shown in FIGS. 3 and 4. The washers 158 and 160 act as a tensioning member and allows for expansion due to changes in the temperature of the environment in which treatment device 100 is placed.

Next, an electrical contact ring 164 is placed next to nut 162 and secured with a nut 166. Upper and lower contact rings 164 are coupled to wires 168 and 170, respectively, which in turn are connected to a control device 300, as shown in FIG. 3. A cover 172 is placed over the components 154, 156, 158, 160, 162, 164, and 166 to protect each from the environment and to prevent electrical shock.

Bolt 150 is made of a conductive material and electrically couples electrode 120 to the respective one of wires 168 and 170. In one embodiment, bolt 150 and components 158, 160, 162, and 164 are each made of a conductive material. An exemplary conductive material is stainless steel.

Figure 6:
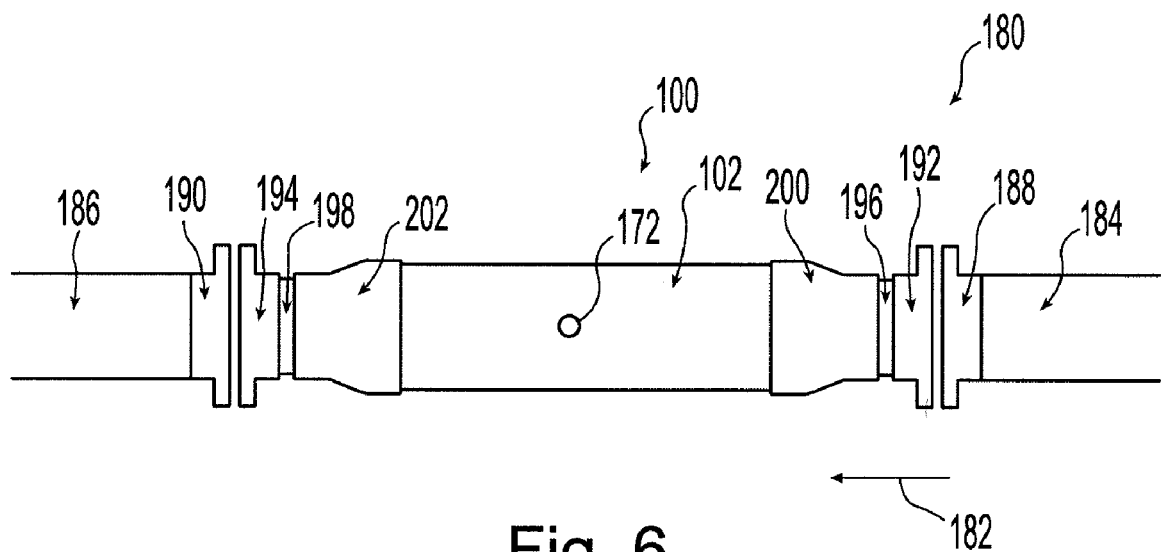
FIG. 6 illustrates an exemplary installation of the treatment device of FIG. 1.

Referring to FIG. 6, an exemplary installation of treatment device 100 is shown. A pipe 180 is shown having a portion removed. Treatment device 100 is inserted into the location of the removed section between a first pipe section 184 and a second pipe section 186. First pipe section 184 and second pipe section 186 each have a respective flange 188 and 190 coupled thereto. Treatment device 100 is coupled to a first flange 192 and a second flange 194 which are coupled to flanges 188 and 190, respectively, through a plurality of couplers, such as bolts. Seals are interposed between the respective flanges. First pipe section 184, treatment device 100, and second pipe section 186 form a generally fluid tight pathway for fluid 104. Fluid 104 travels in direction 182 through first pipe section 184, through treatment device 100 and through second pipe section 186.

Interposed between treatment device 100 and first flange 192 are a pipe section 196 and an adapter 200. Pipe section 196 and adapter 200 are included because conduit 102 is of a different size than first pipe section 184. In a similar fashion interposed between treatment device 100 and second pipe section 186 are a pipe section 198 and adapter 202.

In one embodiment, pipe sections 184 and 186 are vertically oriented such that direction 182 is generally perpendicular to the ground. In one embodiment, pipe sections 184 and 186 are horizontally oriented such that direction 182 is generally parallel to the ground. In one example, electrodes 120 are oriented such that the main treatment surface 130 of each electrode 120 are oriented generally vertical when direction 182 is generally parallel to the ground. In this manner, fluid 104 contacts both of the electrodes 120 even when conduit 102 is only half full. In contrast, if electrodes 120 were oriented such that main treatment surface 130 are oriented generally horizontal when direction 182 is generally parallel to the ground, the circuit between electrodes 120 would not be completed unless fluid 104 generally completely filled the area 110.

Treatment device 100 may be used to treat any type of fluid 104 used as a liquid coolant in an application, such as building cooling, refrigeration, and machine cooling. Treatment device 100 treats fluid 104 to control scaling on the heat transfer surfaces of the respective application. Scale buildup on the heat transfer surfaces reduces the efficiency of the application. Treatment device 100 may also be used in a once through application, such as with a faucet, a coffee maker, ice maker, water heater, or other suitable device which provides or otherwise utilizes a fluid. Further, treatment device 100 may be used with a pressurized closed loop system. Exemplary closed loop systems are provided in U.S. Provisional Patent Application Ser. No. 60/834,826, filed Aug. 1, 2006 and U.S. Utility patent application Ser. No. 11/830,148, filed Jul. 30, 2007, the disclosures of which are expressly incorporated by reference herein.

Figure 7:
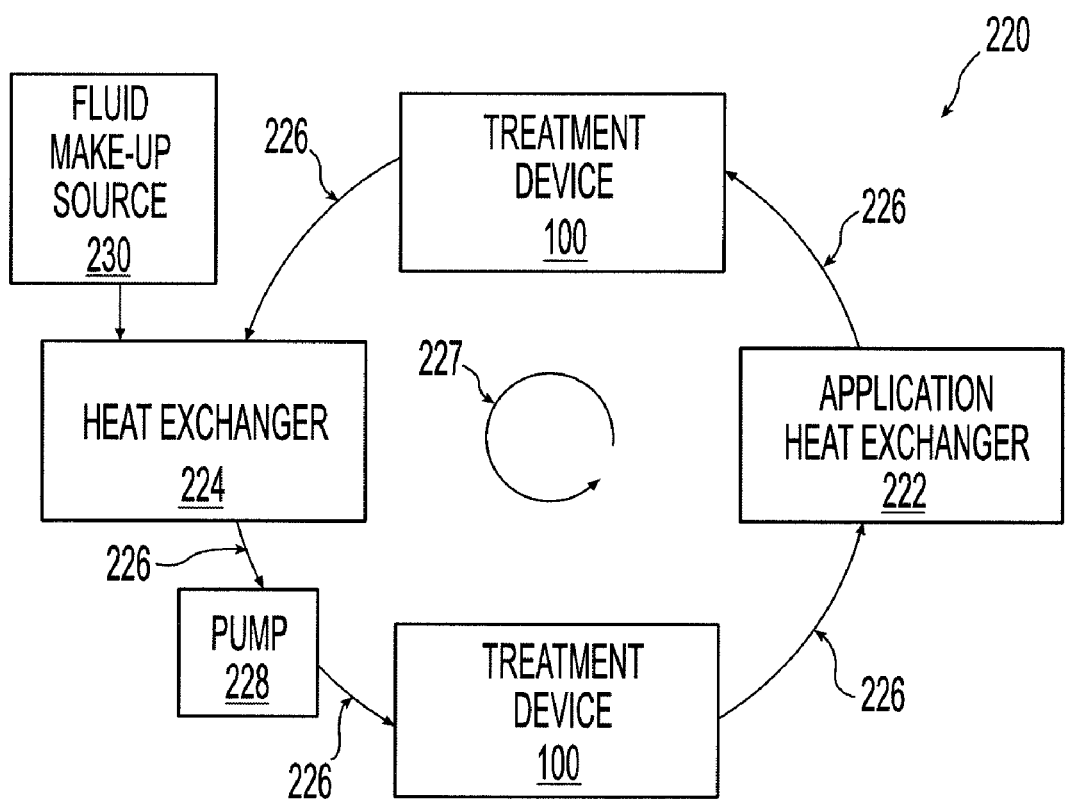
FIG. 7 illustrates an exemplary cooling system incorporating one or more treatment devices of FIG. 1.

Referring to FIG. 7, an exemplary application 220 is illustrated. Application 220 includes an application heat exchanger 222, a heat exchanger 224, and piping 226 connecting heat exchanger 224 and application heat exchanger 222. Fluid 104 flows through application heat exchanger 222, heat exchanger 224, and piping 226 in a circuit 227. Heat exchanger 224 cools fluid 104 to a lower temperature. Exemplary heat exchangers 224 include cooling towers. The cooled fluid 104 is pumped by a pump 228 back to application heat exchanger 222 whereat it takes on heat. Application heat exchanger 222 corresponds to the application use of the cooled fluid 104 provided by heat exchanger 224. Exemplary application heat exchanger 222 include chillers, fan coil units, manufacturing machinery, electrical power generation equipment, and other suitable devices. In one embodiment, application heat exchanger 222 is a heat exchanger for a pressurized closed loop circuit that has an application heat exchanger of its own. Exemplary closed loop circuits are provided in U.S. Provisional Patent Application Ser. No. 60/834,826, filed Aug. 1, 2006 and U.S. Utility patent application Ser. No. 11/830,148, filed Jul. 30, 2007, the disclosures of which are expressly incorporated by reference herein.

In the illustrated embodiment, circuit 227 is an open loop and a makeup fluid source 230 is provided to replace any fluid 104 that may be lost. An exemplary heat exchanger 224 for an open loop circuit 227 is an evaporation cooling tower. With an evaporation cooling tower, fluid 104 may be lost due to evaporation, drift, and the removal of fluid during a blow down operation. One or more treatment devices 100 may be placed in circuit 227 to treat fluid 104.

Figure 8:
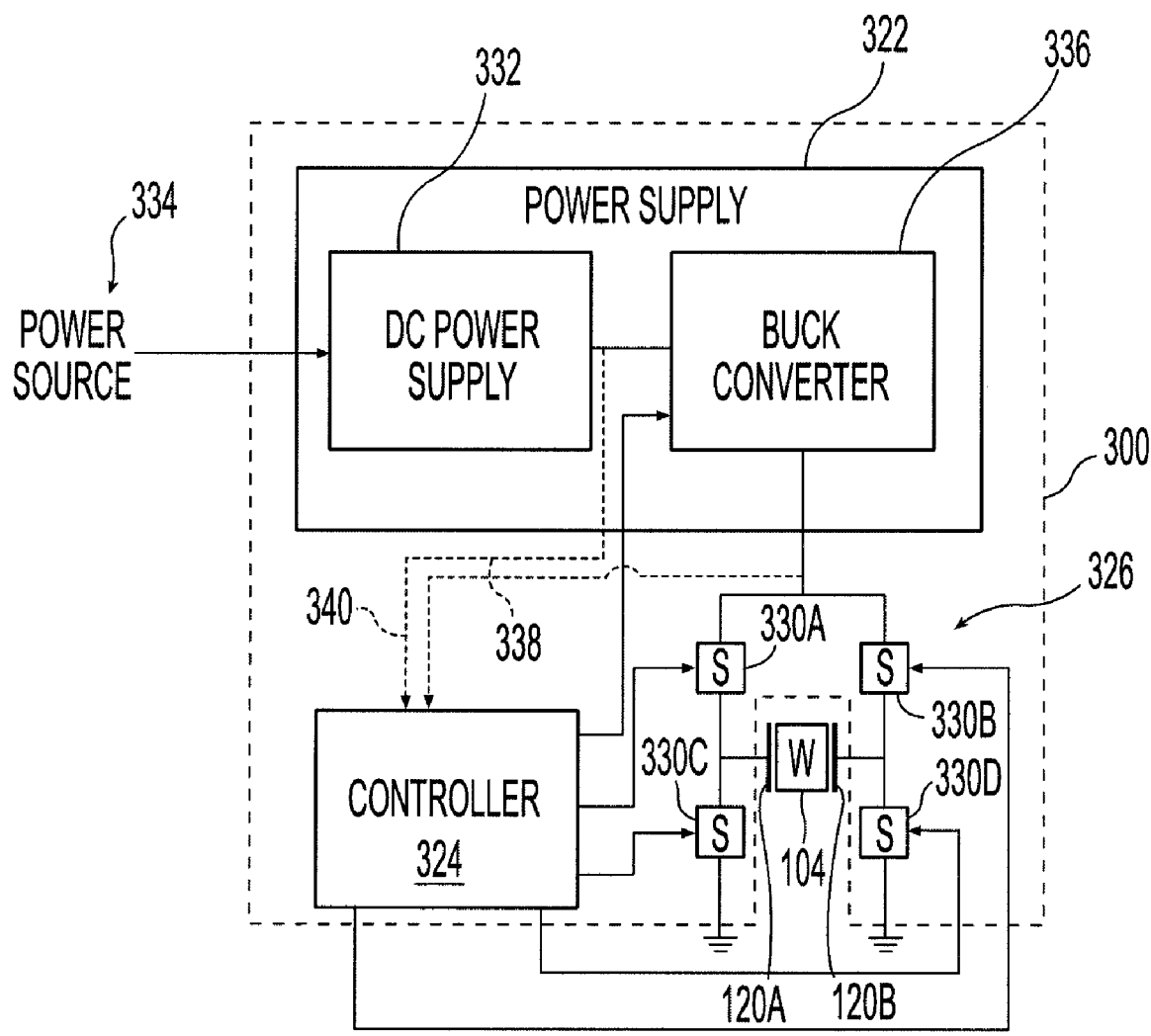
FIG. 8 illustrates an exemplary control unit of the treatment device of FIG. 1.

Returning to FIG. 3, electrodes 120 are coupled to a control device 300. Control device 300 establishes a potential difference between electrodes 120. Referring to FIG. 8, a representative view of control device 300 is shown. Electrodes 120 are illustratively identified as electrodes 120A and 120B.

Control device 300 includes a power supply 322 and a controller 324. Power supply 322 provides the potential difference to first electrode 120A and second electrode 120B. Power supply 322 provides a generally DC signal output which is provided to first electrode 120A and second electrode 120B through a switching circuit of control device 300, illustratively an H-bridge circuit 326. H-bridge circuit 326 includes a plurality of switches 330A-D. Current flows from power supply 322 through first electrode 120A, fluid 104, and second electrode 120B when switches 330A and 330D are closed and switches 330B and 330C are open. Current flows from power supply 322 through second electrode 120B, fluid 104, and first electrode 120A when switches 330B and 330C are closed and switches 330A and 330D are open. As such, by controlling the operation of switches 330A-D, controller 324 may control the direction of current travel through fluid 104 and the duration of a given potential difference. In one embodiment, switches 330A-D are transistors, such as MOSFET type transistors.

In one embodiment, the potential difference applied between electrodes 120A and 120B of control device 300 is an alternating potential difference, wherein during a first time period current flows from first electrode 120A through fluid 104 to second electrode 120B and during a second time period current flows from second electrode 120B through fluid 104 to first electrode 120A. In one embodiment, the first time period and the second timer period are generally of equal duration and repeat over time. In one example, the first time period and the second time period comprise a cycle and are repeated at a rate of at least about 1000 cycles per second, at least about 2000 cycles per second, at least about 3000 cycles per second, in the range of about 1000 cycles per second to about 9000 cycles per second, in the range of about 2000 cycles per second to about 8000 cycles per second, and in the range of about 3000 cycles per second to about 7000 cycles per second. In one embodiment, the duration of the first time period and the second time period varies over time.

In one embodiment, a duty cycle of the cycle is less than 100 percent. In one embodiment, a duty cycle of the cycle varies over time. In one embodiment, a duty cycle of the cycle remains at 100 percent until a voltage across fluid 104 falls below a threshold voltage, thereafter the duty cycle is less than 100 percent until the voltage across fluid 104 rebounds above the threshold voltage.

Control device 300, in response to changes in the conductivity between first electrode 120A and second electrode 120B, adjusts one or more characteristics of the potential difference between first electrode 120A and second electrode 120B. Changes in the conductivity between first electrode 120A and second electrode 120B may be due to changes in the conductivity of fluid 104 and/or due to fouling of the surface 130 of one or both of first electrode 120A and second electrode 120B. Exemplary types of fouling include the accumulation of unwanted materials on the surface of the electrode.

In one embodiment, control device 300 maintains a generally constant power between first electrode 120A and second electrode 120B. In one example, a generally constant power is maintained between first electrode 120A and second electrode 120B if an average power over a period of time generally corresponds to the desired target power. In one example the period of time is the first time period. In one example, the period of time is the time a potential difference is applied across fluid 104 during the first time period, one-half of the first period of time in the case of a fifty percent duty cycle. In one embodiment, the target power is at least 1 watt. In one embodiment, the target power is in the range of about 1 watt to about 100 watts. The target power depends on the quantity of fluid between the electrodes, the conductivity of the fluid, and/or the chemical make-up of the fluid.

Further, in one embodiment, the target power relates to a target voltage which corresponds to a minimum target field strength between the first electrode 120A and the second electrode 120B. In one example, the target voltage set point is set to maintain a field strength between electrodes 120A and 120B at or above about 0.5 V per centimeter (V/cm). In one example, the target voltage set point is set to maintain a field strength between electrodes 120A and 120B at or above about 1.0 V/cm. In one example, the target voltage set point is set to maintain a field strength between electrodes 120A and 120B in the range of about 0.5 V/inch to about 5 V/inch. In order to determine the target voltage, the field strength is multiplied by the spacing between the electrodes 120A and 120B.

The area of each of electrodes 120A and 120B, the spacing between electrodes 120A and 120B, and the conductivity between electrodes 120A and 120B each relate to the overall load resistance. As the electrode area increases the desired target power should be increased. As the electrode spacing increases the desired target power should be increased and the target voltage should be increased to maintain a desired target field strength. In one embodiment, the target voltage is based on the spacing of the electrodes and the target power is based on the cubic volume of fluid passing between the electrodes per minute.

Since the area of each electrode 120A and 120B and the spacing between electrodes 120A and 120B are both constant for a given setup, the variable that effects the load resistance between electrodes 120A and 120B is the conductivity between electrodes 120A and 120B. As such, in order to maintain a constant power between electrodes 120A and 120B, control device 300 should be able to adjust one or more characteristics of the potential difference applied to electrodes 120A and 120B. Exemplary characteristics include the peak voltage of the potential difference and the duty cycle of the potential difference.

In one embodiment, control device 300 provides a constant power output which attempts to maintain a constant power between electrodes 120A and 120B. Further, control device 300 includes a target voltage set point. As the load resistance between electrodes 120A and 120B decreases (the conductivity increases), the peak voltage applied across electrodes 120A and 120B decreases and the current between the electrodes 120A and 120B increases.

As the peak voltage continues to fall due to further decreases in the load resistance, the target voltage set point is reached. The target voltage set point is set to correspond to the desired target power across the electrodes 120A and 120B given the current capacity of the power supply of control device 300 or the desired field strength, whichever is higher. In one embodiment, the power supply of the control device 300 includes a buck converter. As is known, the sustained current level that the buck converter may deliver is limited by the size of the output capacitors of the buck converter. The capacity may be increased by increasing the size and cost of the buck converter. However, control device 300 through a target voltage set point provides a lower cost circuit with the ability to still provide generally constant power by reducing the duty cycle.

Once the target voltage set point is reached, a further reduction in the peak voltage across electrodes 120A and 120B would result in either a current that is higher than the sustained current level of the power supply likely resulting in damage to the power supply over time or a field strength that is too low due to the lower voltage. In one embodiment, control device 300 counters this by reducing the duty cycle of the pulse applied during the first time period and the second time period. For example, if the target voltage was set to 5 volts and the peak voltage across electrodes 120A and 120B wanted to drop to 2.5V due to a further drop in the load resistance between electrodes 120A and 120B, control device 300 would alter the duty cycle to be 50% and deliver about a 5V pulse for half of the time for the given time period of the first time period and the second time period with approximately double the current from the current that would correspond to a 2.5V pulse at 100% duty cycle. This, in effect, provides at least the target power for the on time of the pulses.

In one embodiment, power supply 322 of control device 300 produces an output having a generally constant power. Power supply 322 includes a DC power supply 332 which is coupled to a source of power 334, such as a standard AC power source. In one embodiment, dc power supply 332 provides an output of about 24 volts (V) at about 1 ampere (A). Other voltages and amperage may be implemented based on the power requirements of treatment device 100. Power supply 322 also includes a DC to DC converter, illustratively a buck converter 336. Buck converter 336 may be used to alter the voltage of an input signal to produce an output signal of another voltage, but having generally the same power as the input signal. For instance, disregarding any losses, buck converter 336 may be used to convert the input signal from DC power supply 332 (24V, 1 A) to an output signal of 12 V and 2 A. The voltage of the signal output by buck converter 336 is controlled by a controller 324.

In one embodiment, controller 324 is a hardware controller. In one embodiment, controller 324 is a implemented through a processor having associated software. An exemplary method of operation of controller 324 is provided in FIG. 20 and discussed herein.

In the illustrated embodiment, controller 324 monitors the potential difference between first electrode 120A and second electrode 120B represented by line 338 and an input current to buck converter 336 represented by line 340. In one embodiment, controller 324 is configured to maintain a target power between electrodes 120A and 120B as the conductivity between electrodes 120A and 120B changes. In one embodiment, controller 324 also attempts to maintain a magnitude of the potential difference between first electrode 120A and second electrode 120B at a target voltage or higher. In one embodiment, the target voltage for the potential difference corresponds to the voltage that will permit a sustained current from buck converter 336. In one embodiment, the target voltage corresponds to a desired field strength for a given spacing of first electrode 120A and second electrode 120B. In one embodiment, the target voltage is the average voltage applied for a given duration period. In one embodiment, the target voltage is the peak voltage for the duration that a signal is applied between first electrode 120A and second electrode 120B.

Figure 9:
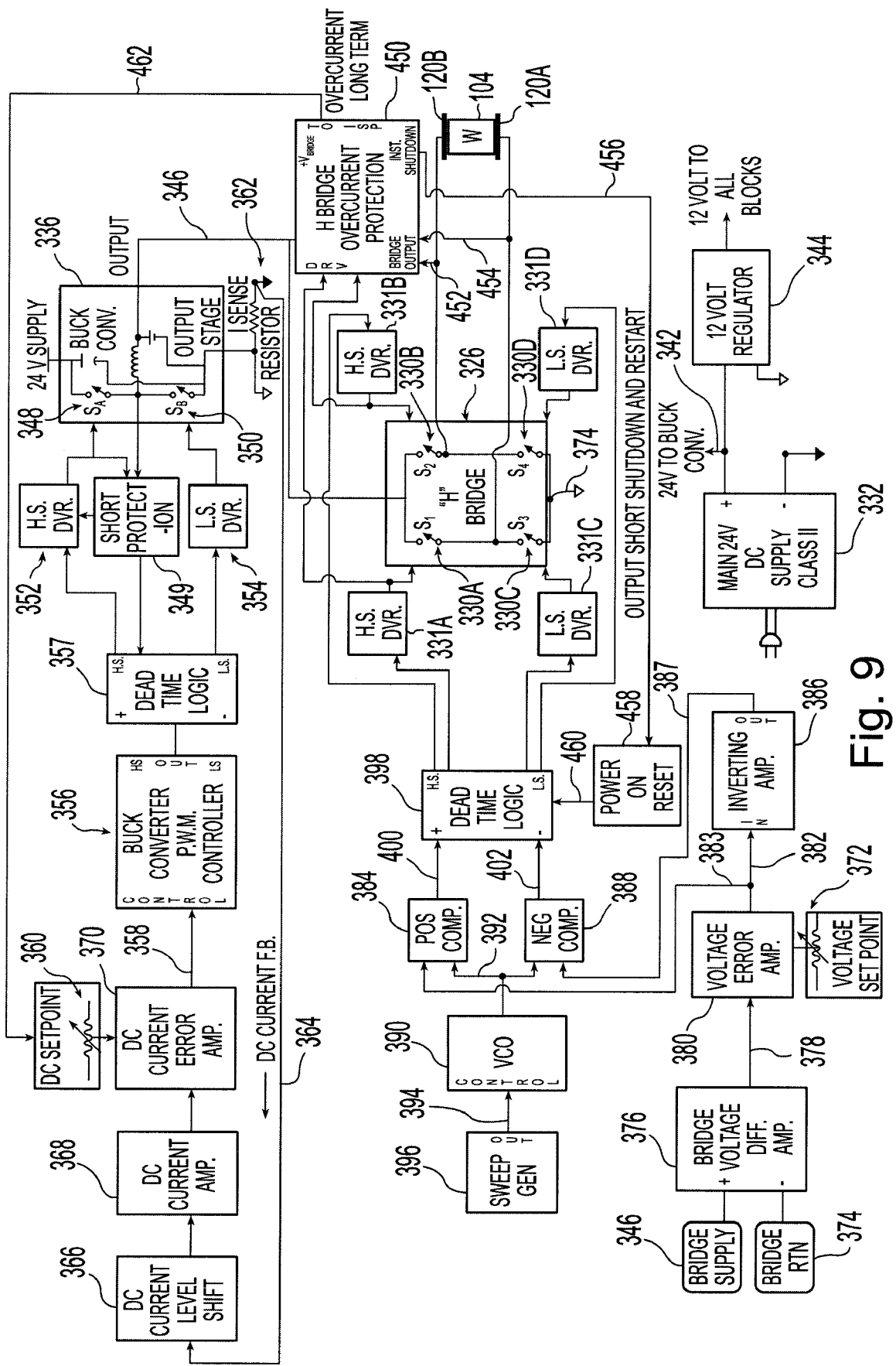
FIG. 9 illustrates an exemplary embodiment of the control unit of FIG. 8.

Referring to FIG. 9, an exemplary embodiment of control device 300 is shown. Power supply 332 is shown as a 24V class II DC power supply. Power is provided to buck converter 336 through line 342. Further coupled to line 342 is a 12 volt regulator 344 which provides 12 volts direct current to the circuitry of controller 324. The electrical ground voltage for logical operations of the embodiment of control device 300 illustrated in FIG. 9 is 6V.

H-bridge circuit 326 is coupled to buck converter 336 through line 346. As the conductivity between first electrode 120A and second electrode 120B increases, H-bridge circuit 326 attempts to draw more current from buck converter 336 through line 346. In contrast, as the conductivity between first electrode 120A and second electrode 120B decreases, H-bridge circuit 326 draws less current from buck converter 336 through line 346.

Buck converter 336 may produce an output signal having a voltage generally between about 0V to the input voltage, illustratively 24V. However, it is desired to maintain the output voltage of buck converter 336 above at least about 2 V to protect the circuitry of buck converter 336. As is known the voltage of the output signal of buck converter 336 is generally controlled through switches 348 and 350. The voltage of the output signal of buck converter 336 is adjusted up and down by varying the time that each of switches 348 and 350 are closed. For example, with a 24V input voltage, a 12V output voltage is produced by having switches 348 and 350 closed about 50% of the time, respectively. Switches 348 and 350 are closed in response to drivers 352 and 354, respectively.

Drivers 352 and 354 are driven by a controller 356 through dead time logic 357. Dead time logic 357 delays the closing of switches 348 and 350 such that both are not closed at the same time. The short circuit protection feedback 349 monitors for a short circuit condition across switches 348 and 350 and provides an input to dead time logic 357 to open at least one of the switches 348 and 350.

Controller 356 based on an input signal on line 358 sets the relative closure times of switches 348 and 350. The input signal on line 358 provides a difference between a desired input current to buck converter 336 set through DC set point 360 and a measured input current to buck converter 336 sensed through a sense resistor 362. A voltage corresponding to the sensed current is provided on line 364 to a DC current level shift 366 which takes into account the 6 V offset for the logical ground of control device 300. The output signal of DC current level shift 366 then passes through an amplifier 368 and is presented to a DC current error amplifier 370 which provides a difference voltage on line 358 to controller 356, the difference voltage corresponding to the difference between the voltage representing the desired current set through set point 360 and the voltage representing the sensed current through sense resistor 362.

In one embodiment, as the conductivity between electrodes 120A and 120B increases, control device 300 may provide an additional voltage to artificially cause the DC set point 360 to indicate a lower desired power from the output of buck converter 336. This in effect will reduce the power applied across H-bridge circuit 326 to avoid damage to control device 300. In one embodiment, overcurrent protection device 450 provides an additional voltage to artificially cause the DC set point 360 to indicate a lower desired power from the output of buck converter 336.

In operation, it will be assumed that set point 360 is set to provide a 12 V output signal on line 346 at 2 A. To produce the 12 V output signal on line 346 at 2 A, switches 348 and 350 of buck converter 336 will be closed approximately 50% of the time, respectively. In one embodiment, set point 360 is in the range of about 0.5 to about 1.5 A. For a 24 V power supply 332, the set point 360 to produce a 12 V output signal on line 346 at 2 A would be about 1 A. Therefore, if the measured voltage on line 364 corresponds to an input current of about 1 A switches 348 and 350 will be closed approximately 50% of the time. If the measured voltage on line 364 corresponds to a sensed current which is higher than 1 A, meaning the output voltage on line 346 is too low, the percentage of time that switch 348 is closed will be increased by controller 356. If the measured voltage on line 364 corresponds to a sensed current which is lower than 1 A, meaning the output voltage on line 346 is too high, the percentage of time that switch 348 is closed will be reduced.

If a constant load was provided for line 346 then the output of buck converter 336 should remain fairly constant. However, with treatment device 100 a constant load is not applied. Rather, the conductivity between first electrode 120A and second electrode 120B changes due to changes in the conductivity of fluid 104, any fouling of first electrode 120A and second electrode 120B, and any debris that may come in contact with one or both of electrodes 120A and 120B.

In one embodiment, it is desired to keep the power applied between electrodes 120A and 120B above a target power to treat fluid 104. This is accomplished in one embodiment by attempting to keep a peak voltage applied between first electrode 120A and second electrode 120B at least above a set point 372.

In one embodiment, the voltage set point corresponds to the voltage needed to produce a target power between electrodes 120A and 120B for a given maximum sustained current of the buck converter 336. In one embodiment, a target power of at least about 20 watts is desired with a target voltage of about 5 V depending on the fluid conductivity. In one embodiment, a target power is in the range of about 1 watt to about 100 watts with a maximum sustained averaged current of about 5 A. In one embodiment, the voltage set point corresponds to the higher of the voltage needed to produce a target power between electrodes 120A and 120B for a given maximum sustained current of the buck converter 336 and a voltage which corresponds to a desired field strength between the electrodes.

As discussed above, if the voltage on line 346 is too low for maintaining the input current at the level set through set point 360, the voltage provided by buck converter 336 on line 346 may be increased resulting in the current on line 346 falling. Assuming the voltage on line 346 satisfies set point 372, control device 300 maintains the duty cycle of the H-bridge circuit at 100 percent.

If however, the voltage on line 346 is too high for maintaining the input current set through set point 360, the output voltage provided by buck converter 336 on line 346 may be decreased resulting in the current on line 346 rising. Again, assuming the voltage on line 346 satisfies the voltage indicated by set point 372 control device 300 maintains the duty cycle of the H-bridge circuit at 100 percent.

However, if the output voltage on line 346 falls below the voltage indicated by set point 372, control device 300 alters the duty cycle of H-bridge circuit 326 to limit the time that a current above the maximum sustained current of the buck converter 336 is applied. This will result in the supply of the target power for at least the duration of the on time of the duty cycle.

The voltage applied between electrodes 120A and 120B is monitored by a difference amplifier 376 which provides a difference on line 378 of the output voltage on line 346 and the voltage on line 374 which is the connection between H-bridge circuit 326 back to buck converter 336. The difference represents the potential difference between first electrode 120A and second electrode 120B. This difference is provided to a voltage error amplifier 380 which compares the difference voltage on line 378 to the voltage set through set point 372 and provides a difference between the two voltages on line 382 as an offset from the logical ground of 6V. This difference is provided to a comparator 384 on line 383 and to a comparator 388 on a line 387 after passing through an inverting amplifier 386.

Comparators 384 and 388 compare the received voltage from amplifiers 380 and 386, respectively, to a voltage provided by a voltage-controlled oscillator ("VCO") 390 on line 392. VCO 390 provides an oscillating voltage on line 392 in response to a given input voltage on line 394. When the input voltage on line 394 is generally constant, the frequency of the oscillating voltage on line 392 is generally constant. As explained herein, the input voltage on line 394 may also be time-varying, such as generated by a sweep generator 396. In one embodiment, the output of VCO 390 is a triangular output. In one embodiment, the output of VCO 390 is a square wave output.

Based on the input voltages to comparators 384 and 388, each provides an output signal to dead time logic 398 on lines 400 and 402, respectively. The operation of switches 330A-D is controlled by drivers 331A-D, respectively, which are in turn controlled by dead time logic 398. When a high input signal is received by dead time logic 398 on line 400 from comparator 384, dead time logic 398 controls driver 331A and driver 331D to close switches 330A and 330D, respectively. This results in current flowing from first electrode 120A through fluid 104 to second electrode 120B. When a high input signal is received by dead time logic 398 on line 402 from comparator 388, dead time logic 398 controls driver 331B and driver 331C to close switches 330B and 330C, respectively. This results in current flowing from second electrode 120B through fluid 104 to first electrode 120A. Dead time logic 398 is configured to time the opening and closing of switches 330A-D to minimize the chance that a short is created by having either switches 330A and 330C or switches 330B and 330D closed at the same time.

Error amplifier 380 is configured to provide a 6 V output when the voltage on line 378 is at or above the voltage indicated by set point 372. As mentioned herein, 6 V is the logical ground for the embodiment of the control device 300 illustrated in FIG. 9. In this situation, the voltage on lines 383 and 387 is 6 V as well because inverting amplifier 386 inverts around the logical ground voltage, which is 6 V. VCO 390 produces an oscillating voltage, such as a triangular output, about the logical ground voltage. As such, assuming error amplifier 380 is outputting a 6 V output, positive comparator 384 provides a high input to dead time logic 398 anytime the voltage on line 392 exceeds 6V and comparator 388 provides a high input to dead time logic 398 anytime the voltage on line 392 falls below 6V. Since VCO 390 produces a time-varying signal about 6V, comparator 384, comparator 388, and dead time logic 398 cooperate to provide a generally square wave output through fluid 104 having a 100 percent duty cycle. This is illustrated in FIG. 10.

Figure 10:
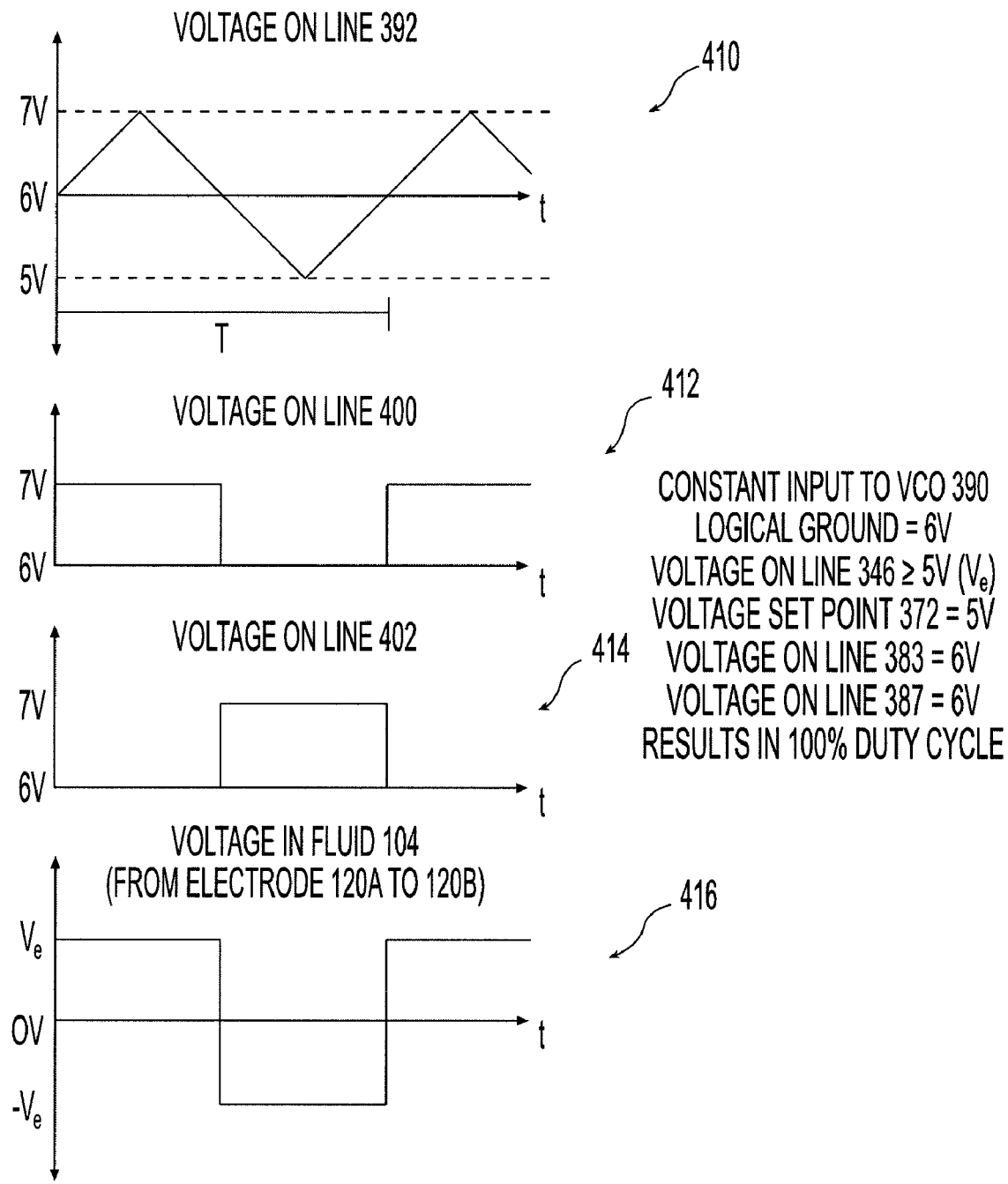
FIG. 10 illustrates exemplary traces for the control unit of FIG. 9 wherein an alternating potential difference between a first electrode and a second electrode has a duty cycle of 100 percent.
Figure 12:
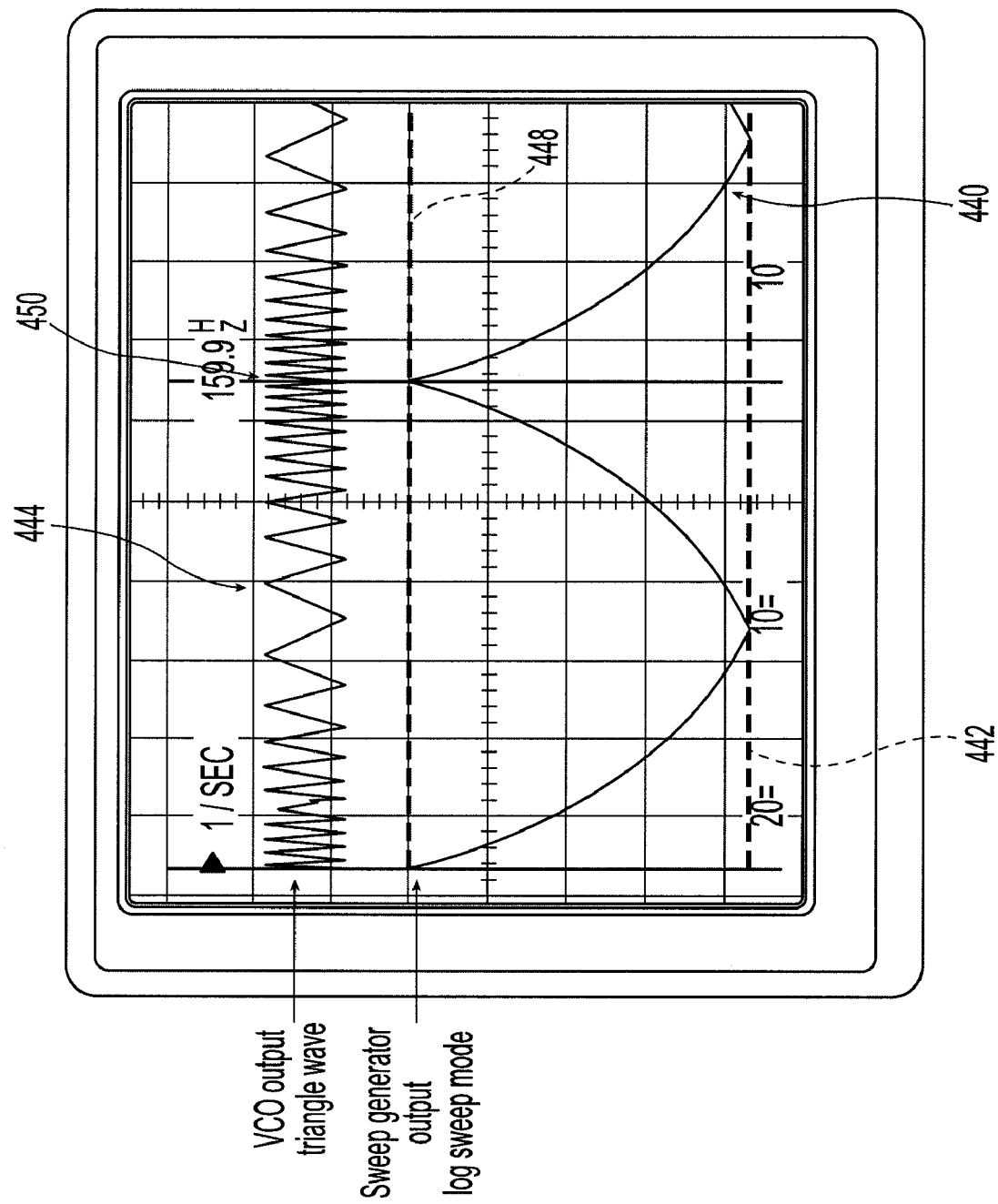
FIG. 12 illustrates the change in output of a VCO of FIG. 9 based on a logarithmic input generated by a sweep generator of FIG. 9.

Referring to FIG. 10, in representative trace 410 the voltage on line 392 from VCO 390 is a triangular wave having a period of T. The period is constant because VCO 390 has a constant voltage input on line 394. The voltage on line 392 fluctuates between 7V and 5V. In one embodiment, wherein sweep generator 396 provides a non-constant voltage input on line 394, period T varies. This is illustrated in FIG. 12. Referring to representative trace 412, comparator 384 puts out a voltage of 7V (a high input) on lines 400 as long as representative trace 410 is above the logical ground of 6V and a voltage of 6V (a low input) when representative trace 410 is at or below logical ground 6V. In contrast, as shown in representative trace 414, comparator 388 puts out a voltage of 7V (a high input) on lines 402 as long as representative trace 410 is at or below the logical ground of 6V and a voltage of 6V (a low input) on lines 402 when representative trace 410 is above logical ground of 6V. As shown in representative trace 416, the voltage in fluid 104 is a square wave with a 100 percent duty cycle. Representative traces 410, 412, 414, and 416 are provided for illustration and do not take into account a change in the conductivity between pair of electrodes 120 nor any delay times, non-linear effects of control device 300, or noise in the signals.

In situations wherein the voltage on line 346 falls below the voltage set through set point 372, error amplifier 380 is configured to provide an output voltage on line 382 equal to the logical ground 6V plus the difference of the voltage set through set point 372 minus the voltage on line 378. For purposes of discussion, it is assumed that the voltage on line 378 is 4.5V and the voltage set through set point 372 is 5V. In this situation the voltage on line 382 is 6.5V and the voltage on line 387 is 5.5V because inverting amplifier 386 inverts around the logical ground voltage, of 6V. Positive comparator 384 is configured to provide a high input to dead time logic 398 anytime the voltage on line 392 exceeds 6.5V, the voltage on line 383 and comparator 388 provides a high input to dead time logic 398 anytime the voltage on line 392 falls below 5.5V, the voltage on line 387. Assuming VCO 390 produces a triangular output varying between 5V and 7V, comparator 384, comparator 388, and dead time logic 398 cooperate to provide a generally square wave output through fluid 104 having a 50 percent duty cycle. This is illustrated in FIG. 11.

Figure 11:
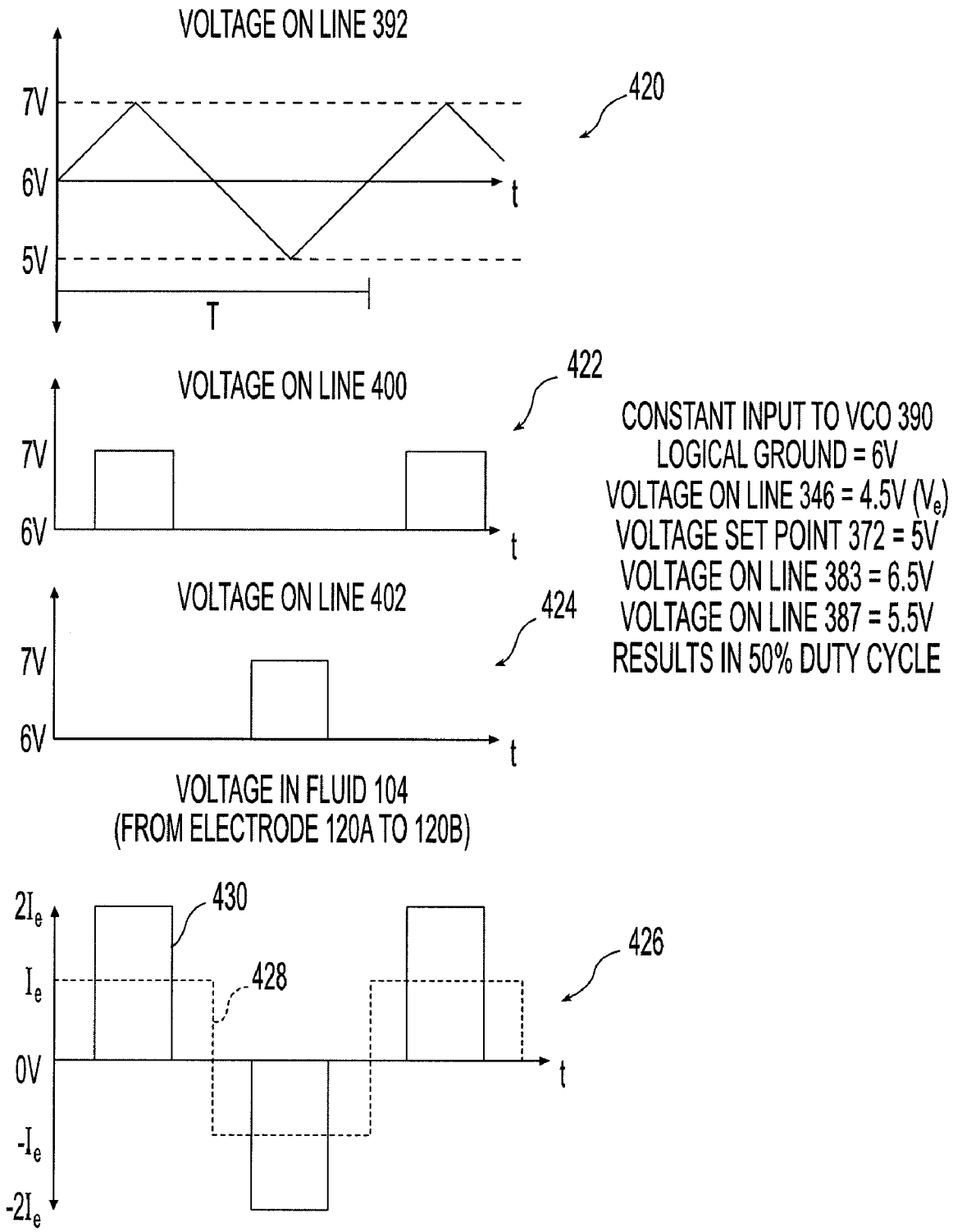
FIG. 11 illustrates exemplary traces for the control unit of FIG. 9 wherein an alternating potential difference between a first electrode and a second electrode has a duty cycle of 50 percent.

Referring to FIG. 11, in representative trace 420 the voltage on line 392 from VCO 390 is a triangular wave having a period of T. The period is constant because VCO 390 has a constant voltage input on line 394. The voltage on line 392 fluctuates between 7V and 5V. Referring to representative trace 422, comparator 384 puts out a voltage of 7V on line 400 as long as representative trace 410 is above 6.5V and a voltage of 6V or ground when representative trace 410 is at or below 6.5V. In contrast, as shown in representative trace 424, comparator 388 puts out a voltage of 7V on line 402 as long as representative trace 410 is at or below 5.5V and a voltage of 6V on lines 402 when representative trace 410 is above 5.5V. As shown in representative trace 426, the voltage in fluid 104 is a square wave with a 50 percent duty cycle. Representative traces 420, 422, 424, and 426 are provided for illustration and do not take into account a change in the conductivity between pair of electrodes 120 nor any delay times, non-linear effects of control device 300, or noise in the signals.

Although the average current across fluid 104 in trace 426 (see 428 in FIG. 11) does not exceed the current corresponding to the voltage set point 372 for a constant power on line 346, the current applied during the on time of the H-bridge circuit 326 (see 430 in FIG. 11) is generally double the current corresponding to the which would have been applied at 100% duty cycle. Therefore, during the time period that power is applied across electrodes 120A and 120B, the threshold target power is at least met or exceeded.

Assuming the voltage on line 378 continues to drop due to further changes in the conductivity between electrodes 120A and 120B, the duty cycle of the signal provided to electrodes 120 continues to drop until a minimum duty cycle is reached. Exemplary minimum duty cycles are about 10 percent or about 20 percent.

Once the minimum duty cycle is reached, a further reduction in the duty cycle will result in a current being applied over fluid 104 above a level that is safe for the operation of control device 300. This is because, as the conductivity of fluid 104 continues to increase the load resistance of fluid 104 becomes generally in the same order of magnitude as the resistance of the transistors of H-bridge circuit 326 and the remaining circuitry. Therefore, the circuitry is dissipating a large percentage of the power applied by buck converter 336 which would likely cause the circuitry to fail over time.

In order to prevent damage to the circuitry of control device 300, an H-bridge over-current protection device 450 is provided. Device 450, in order to protect the circuitry from a short circuit due to high conductivity in fluid 104 (higher than that corresponding to the minimum duty cycle), provides an input to a power on reset device 458 over line 456 to open the switches of H-bridge circuit 326. Power on reset device 458 provides a signal to dead time logic 398 over line 460 which opens the switches of H-bridge circuit 326 until power on reset provides an indication that the switches may be closed again.

However, if the conditions between electrodes 120A and 120B have not changed (still high conductivity) when the H-bridge switches are again activated by dead time logic 398, device 450 will repeatedly quickly turn off H-bridge circuit 326 each time it is turned back on. In order to mitigate the short condition, device 450 further provides a feedback to set point 360 to, in effect, to lower the set point over line 462 such that buck converter 336 produces a lower output power. In one embodiment, this is accomplished through a peak detector circuit which provides a voltage output back to set point 360 which artificially adjusts the set point current.

Figure 13:
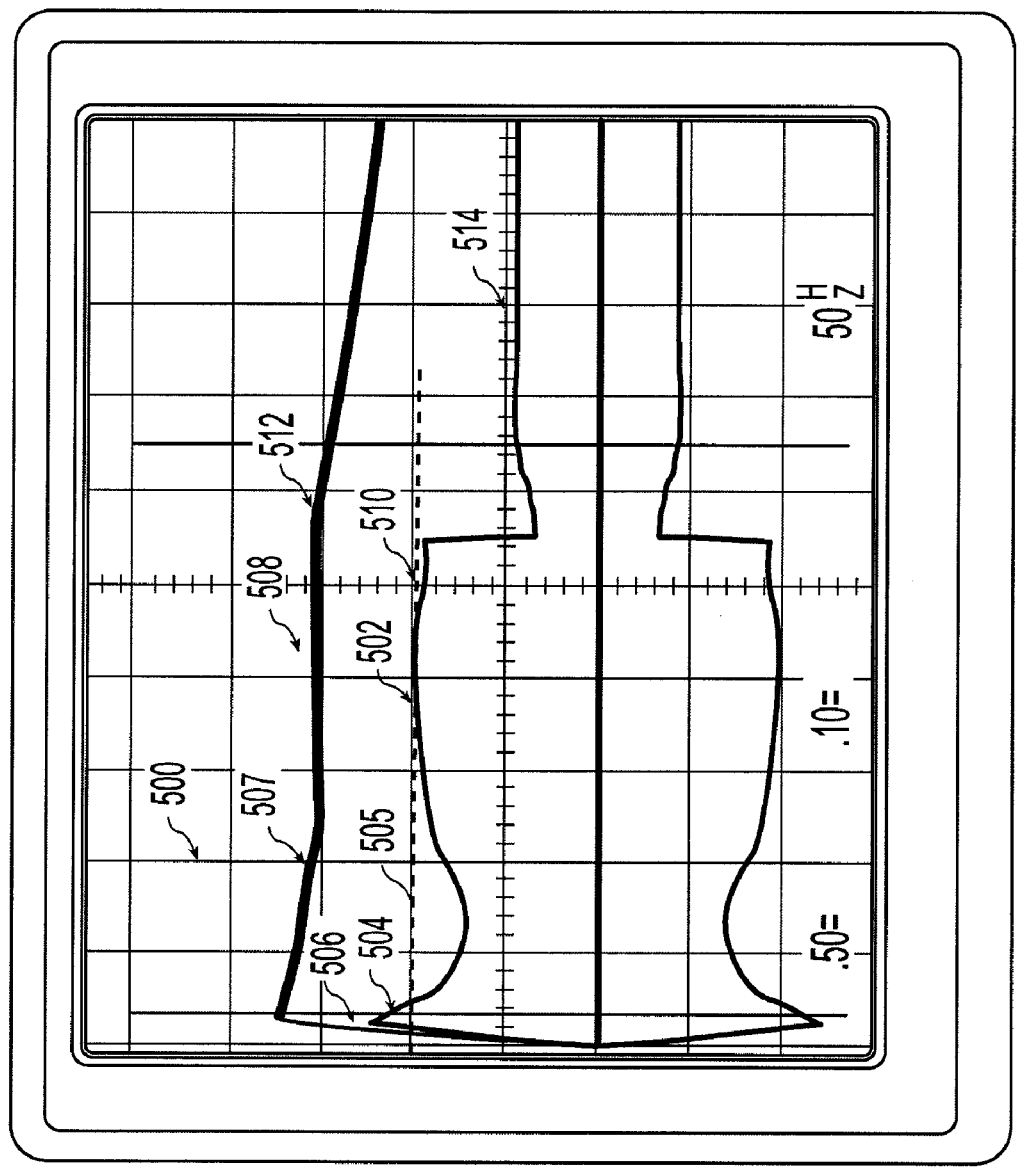
FIG. 13 illustrates exemplary traces for a short protection component of the control unit of FIG. 9.

Referring to FIG. 13, exemplary traces showing the effect of device 450 are shown. The current across H-bridge circuit 326 is illustrated in trace 502. Trace 502 includes many cycles of pulses applied across H-bridge circuit 326 and is thus illustrates as an envelope of the cycles for ease of illustration. At the far left-hand portion 504 of trace 502, the current across H-bridge circuit is at or above a short circuit condition indicated by dashed line 505. In response, a feedback voltage to set point 360 begins to rise, as illustrated by portion 506 of trace 507.

As the feedback voltage rises, the output power of buck converter 336 falls, as indicated by the reduction in current in portion 510 of trace 502. Eventually the feedback voltage reaches a steady state value as indicated by portion 508 of trace 507 resulting in a generally constant current being applied across h-bridge circuit 326 for the small portion of each cycle that a potential is being applied.

Once the short circuit condition is removed, such as a piece of debris becomes dislodged, the feedback voltage decays (see 512 in FIG. 13) and set point 360 begins increasing the output power of buck converter 336. Further, due to the decreased conductivity between electrodes 120A and 120B, the current level between electrodes 120A and 120B falls as indicated by portion 514 of trace 502.

In one embodiment, the input voltage to VCO 390 varies resulting in a varying cycle on line 392. Sweep generator 396 provides a time-varying voltage on line 394 to VCO 390. In one embodiment, as illustrated in FIG. 12, sweep generator 396 provides a time-varying signal 440 which varies between a first voltage 442 corresponding to a minimum frequency or maximum period 444 of the signal output by VCO 390 and a second voltage 448 corresponding to a maximum frequency or minimum period 450 of the signal output by VCO 390. In one example, the minimum frequency is about 1 kilohertz (kHZ) and the maximum frequency is about 9 kHz. In one example, the minimum frequency is about 2 kilohertz (kHZ) and the maximum frequency is about 9 kHz. In one example, the minimum frequency is about 3 kilohertz (kHZ) and the maximum frequency is about 9 kHz. In one example, the minimum frequency is about 3 kilohertz (kHZ) and the maximum frequency is about 7 kHz. In one example, the minimum frequency is at least 3 kilohertz (kHZ). In one example, the maximum frequency is up to 9 kHz. In one embodiment, the frequency is up to about 1 megahertz.

In one embodiment, the time-varying voltage between the first voltage 442 and the second voltage 448 is a linear sweep, such as a triangular wave. In one embodiment, the time-varying voltage between the first voltage 442 and the second voltage 448 is a sinusoidal wave. In one embodiment, the time-varying voltage between the first voltage 442 and the second voltage 448 is a logarithmic sweep as illustrated in FIG. 12. The logarithmic sweep, unlike the linear sweep, produces a larger proportion of cycles at the lower frequencies (corresponding to the first voltage 442) between electrodes 120 than the higher frequencies (corresponding to the second voltage 448) between electrodes 120.

By varying the voltage input to VCO 390, the frequency of the signal between electrodes 120 varies. This assists in promoting the enhancement of resonant phenomena in fluid 104. By varying the frequency, the applied frequency for a time may correspond to a resonant frequency of the components of fluid 104.

Another exemplary embodiment 600 of control unit 300 is provided in FIGS. 14-19. The logical ground of control unit 600 is 0 V. Control unit 600 is connected to electrodes 120A and 120B. Control unit 600 includes a sweep generator 602, a voltage controlled oscillator 604, a power on reset member 606, an H-bridge member 608, high side drivers 610A and 610B, low side drivers 612A and 612B, EMI protection member 613, dead time logic 614, an H-bridge pulse width modulator controller 616, a buck converter 618, a buck converter pulse width modulator controller 620, a high side driver 622 for buck converter 618, a level translator 624, a fast over current member 626, a peak detector 628, a power supply 630, and an indicator member 632.

Three adjustable inputs are provided to control unit 600. These inputs are set during the setup process at the manufacturer. A voltage set point 634, a current set point 636, and a peak current threshold set point 638 are provided. Voltage set point 634 sets a target peak voltage across electrodes 120A and 120B. Current set point 636 sets the input current to buck converter 618 to provide a target power output of buck converter. Peak current threshold set point 638 sets a threshold current for indicating a short circuit situation.

Figure 14:
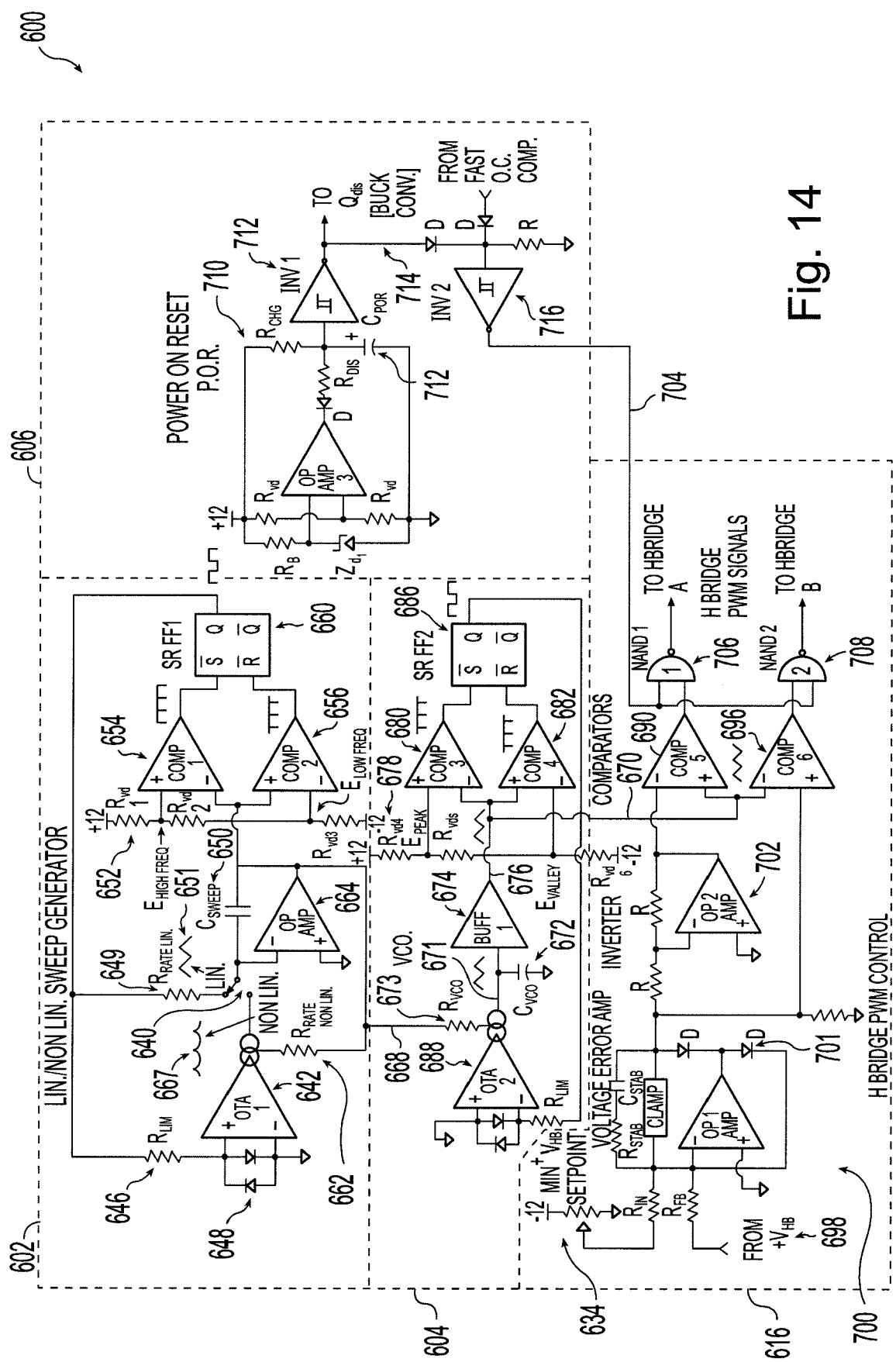

Referring to FIG. 14, sweep generator 602 is illustrated. Sweep generator 602 is a linear and non-linear sweep generator. A switch 640 is positionable in a first position, wherein a linear sweep is produced, and in a second position, wherein a non-linear sweep is produced. The position of switch 640 may be selected during the setup process at the manufacturer.

When switch 640 is positioned in the first position (linear sweep position) the current provided by the SR FF1 Q output through resistor 649 ($R_{RATE\ LIN}$) is being integrated by a capacitor 650 ($C_{SWEEP}$). The value of resistor 649 ($R_{RATE\ LIN}$) controls the frequency of the output signal 651 which is provided on line 668 to voltage controlled oscillator 604. As illustrated the output signal 651 is a triangular wave.

A voltage divider 652 is provided that provides a high frequency threshold voltage ($E_{HIGH\ FREQ}$) on a non-inverting input to a first comparator 654 and a low frequency threshold voltage ($E_{LOW\ FREQ}$) on an inverting input to a second comparator 656. As the voltage on capacitor 650 ($C_{SWEEP}$) increases the voltage on the inverting input of comparator 654 and the non-inverting input of comparator 656 also increase. Once the voltage on capacitor 650 ($C_{SWEEP}$) reaches the high frequency threshold voltage ($E_{HIGH\ FREQ}$), comparator 654 trips and its output goes low. This results in the state of a set/reset flip-flop 660 changing which in turn provides the opposite input to operational transconductance amplifier 642. Switching the input to operational transconductance amplifier 642 eventually results in the voltage on capacitor 650 ($C_{SWEEP}$) decreasing. Once the voltage on capacitor 650 ($C_{SWEEP}$) reaches the low frequency threshold voltage ($E_{LOW\ FREQ}$), comparator 656 trips which results in the state of a set/reset flip-flop 660 changing which in turn provides the opposite input to operational transconductance amplifier 642. This completes a single cycle of the linear sweep generator output signal 651. This process repeats for future cycles.

An operational transconductance amplifier 642 is provided and connected to switch 640 at its output. An exemplary operational transconductance amplifier is Model No. LM 13700 available from National Semiconductor located at 2900 Semiconductor Dr., P.O. Box 58090, Santa Clara, Calif. The amount of output current from the operational transconductance amplifier 642 is set by the value of resistor 662 ($R_{RATE\ NON\ LIN}$) which is connected to the control pin of operational transconductance amplifier 642 and the differential input voltage between the non-inverting and inverting inputs. Diodes 648 limit the input voltage to a safe level. The linear input range is approximately plus or minus 75 millivolts and as such the diode clamped input voltage at plus or minus 600 millivolts provides for maximum output current as set by the control pin.

When switch 640 is positioned in the second position (non-linear sweep position) the current provided by the output of the operational transconductance amplifier 642 is being integrated by a capacitor 650 ($C_{SWEEP}$). A voltage divider 652 is provided that provides a high frequency threshold voltage ($E_{HIGH\ FREQ}$) on a non-inverting input to a first comparator 654 and a low frequency threshold voltage ($E_{LOW\ FREQ}$) on an inverting input to a second comparator 656. As the voltage on capacitor 650 ($C_{SWEEP}$) increases the voltage on the inverting input of comparator 654 and the non-inverting input of comparator 656 also increase. Once the voltage on capacitor 650 ($C_{SWEEP}$) reaches the high frequency threshold voltage ($E_{HIGH\ FREQ}$), comparator 654 trips and its output goes low. This results in the state of a set/reset flip-flop 660 changing which in turn provides the opposite input to operational transconductance amplifier 642. Switching the input to operational transconductance amplifier 642 eventually results in the voltage on capacitor 650 ($C_{SWEEP}$) to decrease. Once the voltage on capacitor 650 ($C_{SWEEP}$) reaches the low frequency threshold voltage ($E_{LOW\ FREQ}$), comparator 656 trips which results in the state of a set/reset flip-flop 660 changing which in turn provides the opposite input to operational transconductance amplifier 642. This completes a single cycle of the non-linear sweep generator. This process repeats for future cycles.

The rate of the non-linear sweep is set by the value of resistor 662 ($R_{RATE\ NON\ LIN}$). Further, the current out of operational transconductance amplifier 642 is modulated by the connection of resistor 662 ($R_{RATE\ NON\ LIN}$) to the control pin of operational transconductance amplifier 642. This reduces the total amount of current that is available out of the operational transconductance amplifier 642 and at lower voltages on capacitor 650 ($C_{SWEEP}$) the rate of change on capacitor 650 ($C_{SWEEP}$) is reduced resulting in a non-linear sweep. The result is a slower sweep rate of change at lower frequencies.

Turning to the voltage-controlled oscillator 604, the output of voltage-controlled oscillator 604 on line 670 is determined by the amount of current going into the voltage-controlled oscillator 604. The amount of current going into voltage-controlled oscillator 604 is provided on line 668 from sweep generator 602. The magnitude of the current is controlled by resistor 673 ($R_{VCO}$).

As the output signal of sweep generator 602 ramps up and down, the amount of current into the voltage-controlled oscillator 604 also changes. A capacitor 672 ($C_{VCO}$) integrates the current and provides a voltage to a buffer 674. Buffer 674 isolates the voltage on it and provides an output voltage on line 676. A second voltage divider 678 is provided that sets a peak threshold voltage ($E_{PEAK}$) on a non-inverting input to a first comparator 680 and a valley threshold voltage ($E_{VALLEY}$) on an inverting input to a second comparator 682. As the voltage on line 676 increases the voltage on the inverting input of comparator 680 and the non-inverting comparator 682 also increase. Once the voltage on line 676 reaches the peak threshold voltage ($E_{PEAK}$), comparator 680 trips and its output goes low. This results in the state of a set/reset flip-flop 686 changing which in turn provides the opposite input to operational transconductance amplifier 688. By providing the opposite input to operational transconductance amplifier 688 the opposite current is provided to line 671. Switching the input to operational transconductance amplifier 688 eventually results in the voltage on line 676 to decrease. Once the voltage on line 676 reaches the valley threshold voltage ($E_{VALLEY}$), comparator 682 trips which results in the state of a set/reset flip-flop 686 changing which in turn provides the opposite input to operational transconductance amplifier 688. By providing the opposite input to operational transconductance amplifier 688 the opposite current is provided to line 671. This completes a single cycle of the voltage-controlled oscillator 604. This process repeats for future cycles.

Turning to the H-bridge pulse width modulation controller 616, the output from VCO 604 on line 670 is provided to a non-inverting input to a first comparator 690 which is ultimately connected to switches 692A and 694B of H-bridge 608 (see FIG. 16) and an inverting input to a second comparator 696 which is ultimately connected to switches 692B and 694B of H-bridge 608. Also, connected to each of comparators 690 and 696 is a voltage that corresponds to a difference between the voltage set point 634 and the voltage drop across the H-Bridge 608, represented as voltage 698 ($V_{HB}$).

A voltage error amplifier 700 is provided which based on the set point voltage 634 and the H-bridge voltage 698, provides an output voltage. When the H-bridge voltage 698 is above or equal to the set point voltage 634, the output voltage of voltage error amplifier 700 is generally zero. When the H-bridge voltage 698 is below the set point voltage 634, the output voltage of voltage error amplifier 700 corresponds to that difference. The voltage difference is provided to directly to a non-inverting input of comparator 696 and is inverted by inverter 702 and provided to an inverting input of comparator 690.

The output of voltage error amplifier 700 is clamped to provide a non-zero output for situations wherein the voltage 698 is below the voltage set point 634 due to diodes 701.

When the output voltage of voltage error amplifier 700 is generally zero, the output of comparator 690 is high whenever the voltage from VCO 604 is positive and is low whenever the voltage from VCO 604 is negative. Further, when output voltage of voltage error amplifier 700 is generally zero, the output of comparator 696 is high whenever the voltage from VCO 604 is negative and is low whenever the voltage from VCO 604 is positive. This results in a 100% duty cycle signal between electrodes 120A and 120B assuming that an output voltage 704 of the power on rest member 606 is high as explained herein.

When the output voltage of voltage error amplifier 700 is non-zero, the output of comparator 690 is high whenever the voltage from VCO 604 is positive and exceeds the magnitude of the output voltage of voltage error amplifier 700 and is low whenever the voltage from VCO 604 is below magnitude the output voltage of voltage error amplifier 700. Further, when output voltage of voltage error amplifier 700 is generally non-zero, the output of comparator 696 is high whenever the voltage from VCO 604 is negative and is below the output voltage of voltage error amplifier 700 and is low whenever the voltage from VCO 604 is greater than the magnitude of the output voltage of voltage error amplifier 700. This results in a duty cycle signal between electrodes 120A and 120B of less than 100%.

In between the outputs of comparators 690 and 696 and H-bridge 608 are two NAND gates 706 and 708. Each of these NAND gates 706 and 708 has as one input an output voltage 704 from power on reset member 606 and as the other input the respective output of comparators 690 and 696. As such, a high output from comparator 690 is provided to H-bridge 608 only when NAND gate 706 also receives a high input on line 704 and a high output from comparator 696 is provided to H-bridge 608 only when NAND gate 708 also receives a high input on line 704.

The voltage on line 704 is controlled by power on reset member 606. Power on reset member 606 provides a low signal during a power up operation and if a threshold current is exceeded as determined by fast over current member 626. Otherwise, power on reset member 606 provides a high signal.

During a power-up operation, power on reset member 606 delays the sending of output signals from NAND gates 706 and 708 for a time to make sure the output voltage of the buck converter is at an operational voltage and to charge the storage capacitors of the H-bridge high side drivers.

Power on reset member 606 includes a circuit 710 which charges up a capacitor 712. Once capacitor 712 reaches a threshold voltage, such as 12 volts, the output of a first Schmidt trigger CMOS inverter 714 goes low providing a low voltage on line 716. Line 716 is connected to a second Schmidt trigger CMOS inverter 716. The output of the second Schmidt trigger CMOS inverter 716 goes high in response to the low on line 716 providing a high voltage on line 704 to both the NAND gates 706 and 708. This in effect, turns on the H-bridge 608.

When the output of first Schmidt trigger CMOS inverter 714 goes low then a transistor 718 (FIG. 15) of buck converter 618 is turned off. This turns on the output voltage 698 to H-bridge 608.

Dead time logic 614A and 614B receive the output from NAND gates 706 and 708, respectively. Each of dead time logic 614A and 614B include a first circuit 720A and 720B which turn on the respective high side drivers 610A and 610B and include a second circuit 722A and 722B which turn on the respective low side drivers 612A and 612B. Circuits 720A and 720B are configured to turn respective inverters 724A and 724B off quickly due to the direction of the diode in the circuit. As explained herein, dead time logic is provided such that switches 692A and 694B are not turned on at the same time and such that switches 692B and 694A are not turned on at the same time. In general drivers 610A and 610B are turned off prior to their counterpart 612A and 612B and the other of drivers 610A and 610B turns on after the prior driver 612A and 612B has turned off.

Through the control of switches 692A, 692B, 694A, and 694B, a circuit is completed between electrodes 120A and 120B through fluid 104. Switches 692A and 694A are on together (switch 692A connected to voltage 698) such that current flows from electrode 120a through fluid 104 to electrode 120B. Switches 692B and 694B are on together (switch 692A connected to voltage 698) such that current flows from electrode 120B through fluid 104 to electrode 120A. In this manner, by controlling the operation of switches 692A, 692B, 694A, and 694B an alternating potential may be established through fluid 104.

Figure 15:
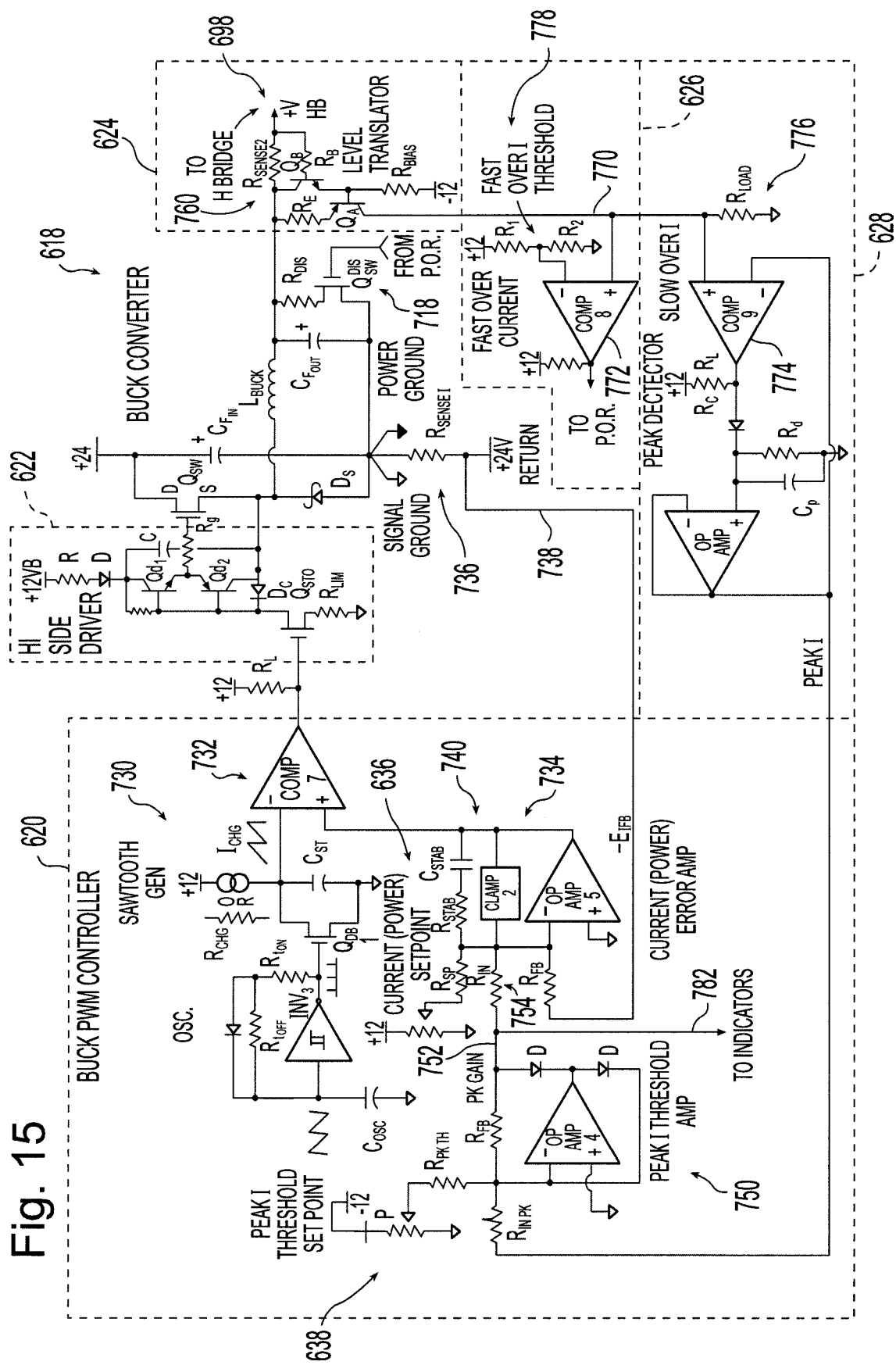
Figure 16:
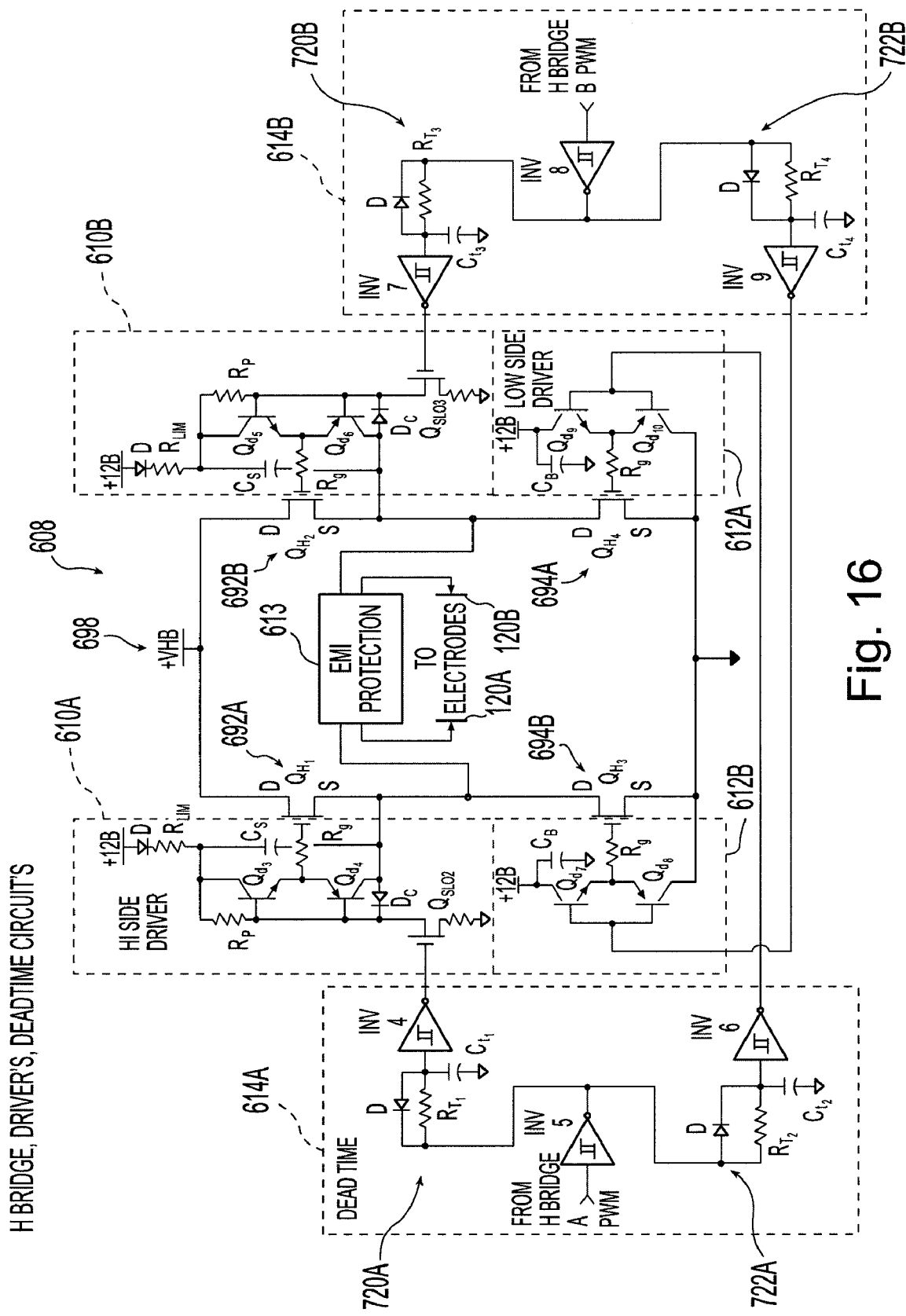
Figure 17:
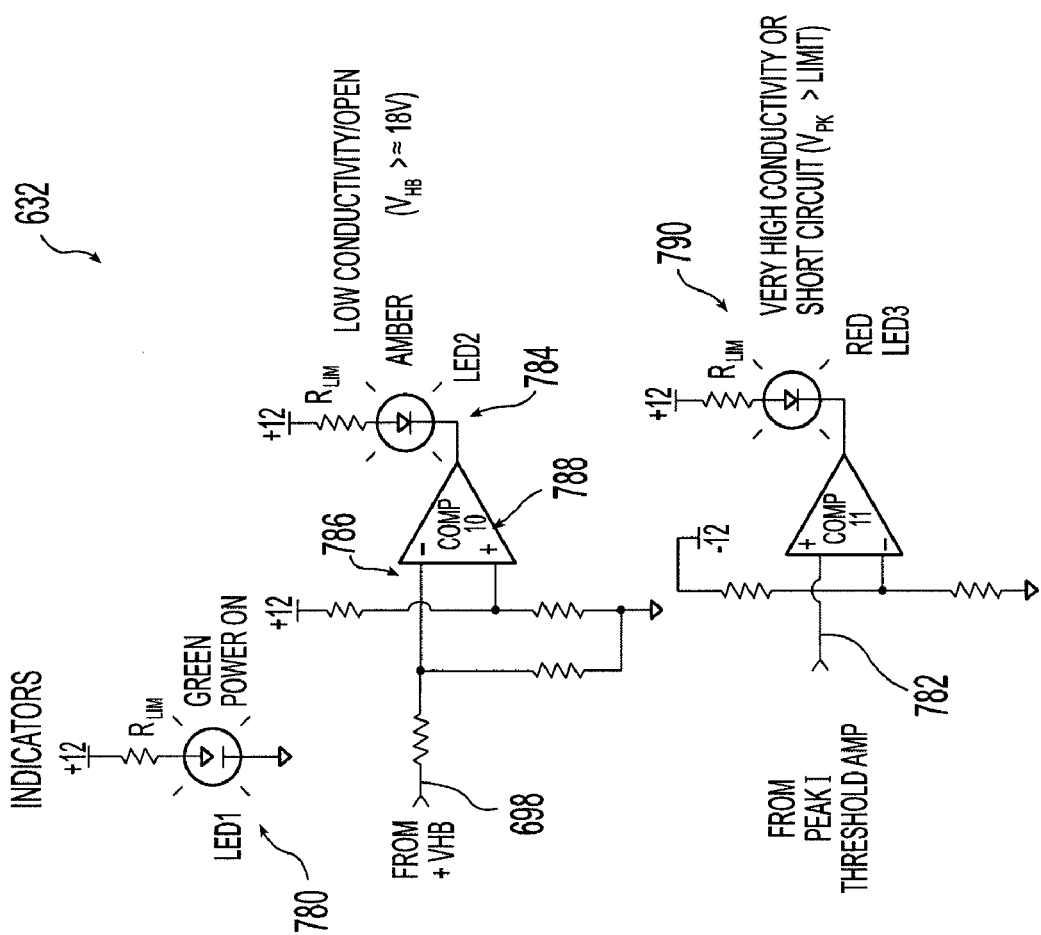

Turning to the buck converter pulse width modulation controller 620 in FIG. 15, a sawtooth generator 730 is provided. The sawtooth generator may include a current source or a resistor. The saw tooth generator 730 is coupled to the inverting input of a comparator 732. The non-inverting input of comparator 732 is coupled to a current set point error amplifier circuit 734. The current set point error amplifier circuit 734 monitors the input current to buck converter 618 through resistor 736 ($R_{SENSE}$). The voltage on line 738 is a negative voltage as indicated by resistor 736 being positioned between the signal ground and the 24 return. It should be noted that control unit 600 has as its logical ground 0 volts as compared to the six volt logical ground of the control unit illustrated in FIG. 9.

The current set point error amplifier circuit 734 includes a stability circuit 740 for loop stability and a clamp which prevents the voltage supplied to comparator 732 from getting out of an expected operating range. In one embodiment, the clamp is a Zener diode. Through this portion of the buck converter pulse width modulation controller 620 a generally constant input current is provided to buck converter 618.

In addition to maintaining a generally constant input current is provided to buck converter 618, buck converter pulse width modulation controller 620 includes a peak current threshold circuit 750. A peak detector 628 is connected to the output of buck converter 618 through a level translator 624. Peak detector 628 provides an indication of the peak current to peak current threshold circuit 750 which compares it a peak current set point 638. The peak current threshold circuit 750 provides a mechanism to effectively lower the current set point 636 in over current situations wherein the conductivity of the fluid 104 is very high or a short is present between electrodes 120A and 120B.

The peak current threshold circuit 750 provides a zero output on line 752 until a peak current (corresponding voltage) exceeds the threshold peak current 638 (corresponding voltage). At that point, a positive voltage is provided on line 752. When a positive voltage is present on line 752, the drop across resistor 754 effectively reduces the current set point 636. This makes sure that control unit 600 stays in a safe operating state during periods of extremely high conductivity.

Turning to the level translator member 624, an output voltage 698 of the buck converter 618 is monitored through a resistor 760 ($R_{SENSE2}$). As the voltage output from buck converter 618 may be anywhere between about 2V to about 24V, level translator member 624 scales the voltage to the logical level range.

As the voltage 698 decreases, the conductivity of the fluid 104 is generally increasing and the voltage on line 770 is increasing. As shown, a non-inverting input to a comparator 772 of the fast over threshold member 626 and a non-inverting input to a comparator 774 of peak detector 628 are coupled to line 770. The voltage on line 770 is also dependent on the value of a resistor 776 ($R_{LOAD}$).

Once a voltage on line 770 exceeds an over current threshold voltage 778 set through a voltage divider coupled to the inverting input of comparator 772, comparator 772 provides a high output which changes the output state of inverter 716 of power on reset member 606. This will result in switches 692A, 692B, 694a, and 694B of H-bridge 608 to be turned off and current to stop being provided to fluid 104. This will in turn result in a decrease of the voltage on line 770 which is then below the set point voltage 778. This results in the output of comparator being low and the output state of inverter 716 again being based on the output state of inverter 712. This results in switches 692A, 692B, 694a, and 694B again being controlled based on the output of comparators 690 and 696. Assuming the conductivity of fluid 104 has returned to an acceptable level, the output of comparator 772 remains low. However, if the conductivity of the fluid 104 is still high, the voltage on line 770 will again cause the output voltage of comparator 772 to go high, thereby shutting off switches 692A, 692B, 694a, and 694B.

The voltage on line 770 is also coupled to the non-inverting input of comparator 774 of peck detector 626. The detector circuit charging capacitor Cp each time it is kicked on and then once Cp has a voltage that exceeds the peak threshold 638, circuit 750 provides an output on line 752.

Assuming the high conductivity situations continues, peak detector 628 and peak current threshold circuit 750 cooperate to reduce the current set point 636 thereby reducing the current output of buck converter 618. As the conductivity of fluid 104 lowers, the artificial change of current set point 636 is removed.

Turning to indicator member 632, a plurality of visual indicators are illustrated. Exemplary visual indicators include light emitting diodes ("LED"). Although visual indicators are illustrated other or additional indicators may be implemented, including audio and tactile. In one embodiment, a wireless communication module is provided that provides an indication signal to a remote device for one or more of the three situations discussed below. In one example, the wireless communication device include a cellular transceiver which places a call to a monitoring station over a cellular network.

A first indicator 780 is connected to the power supply. Indicator 780 is illustrated as a green LED. Indicator 780 when lit provides an indication that control unit 600 is powered on.

A second indicator 784 is connected to line 698 of level translator 624. Indicator 784 is illustrated as an amber LED. Indicator 784 when lit provides an indication that the conductivity between electrodes 120A and 120B is below a threshold amount. The threshold amount is set through the values chosen for resistors 786. In one embodiment, the threshold is set to 18V. As such, when the voltage on line 698 exceeds 18V, comparator 788 turns on indicator 784. Exemplary situations wherein the conductivity between the electrodes would be below the threshold include fluid 104 is not in contact with both electrodes 120A and 120B and fluid 104 has frozen or at least reduced in temperature. Further, a broken wire would manifest itself as low conductivity.

A third indicator 790 is connected to line 782 of buck converter pulse width modulator controller 620. Indicator 790 is illustrated as a red LED. Indicator 790 when lit provides an indication that the conductivity between electrodes 120A and 120B is above a threshold amount set by the peak detector threshold 638. Exemplary situations wherein the conductivity between the electrodes would be above the set point include a high conductivity of fluid 104 and a short circuit.

Figure 18:
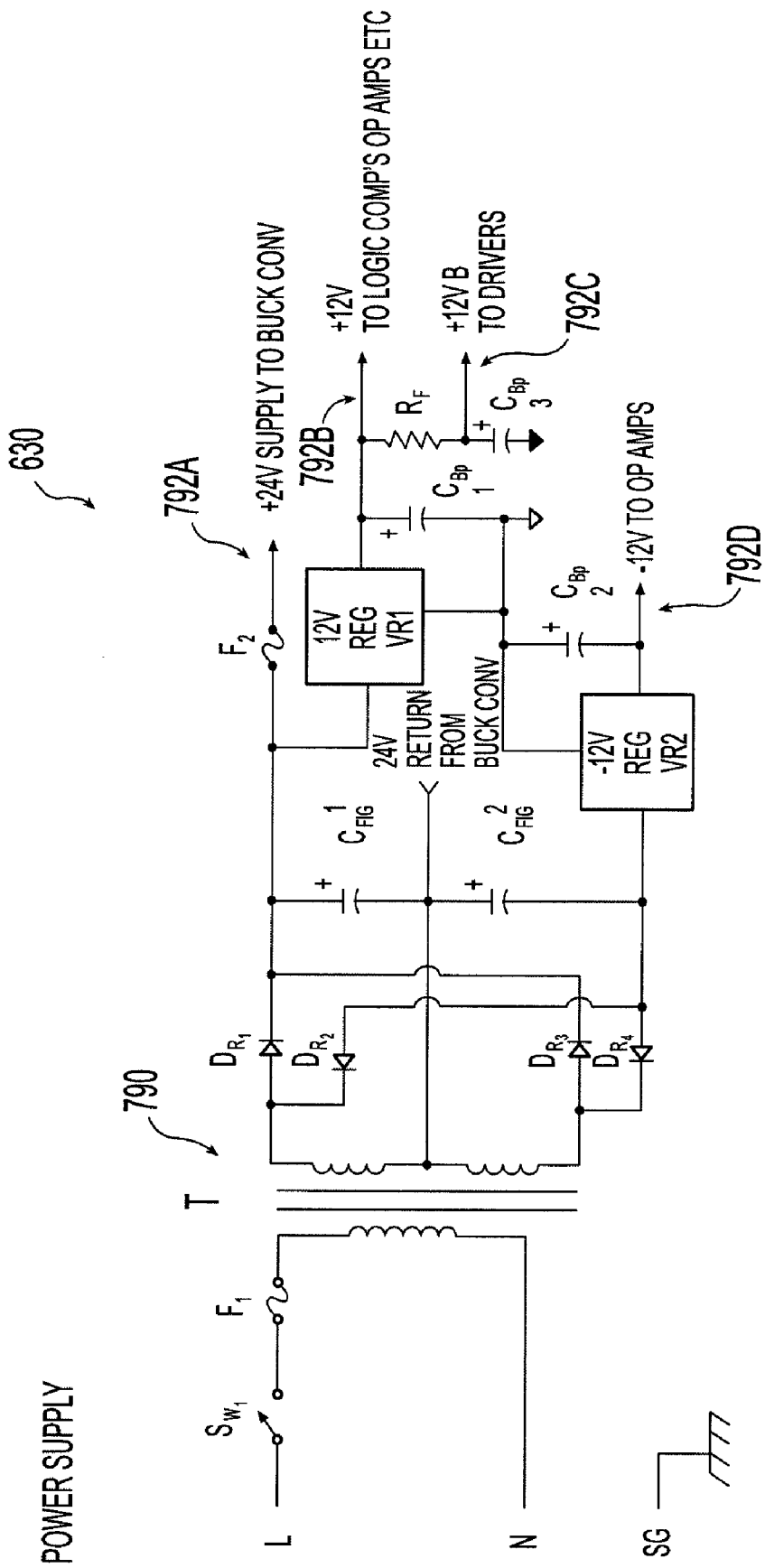

Any suitable power supply may be used as part of control unit 600. A first exemplary power supply 630 is shown in FIG. 18. Power supply 630 is connected to a source of power, such as an AC outlet. Power supply 630 includes a transformer 790. Power supply 630 includes four outputs 792A-D. Output 792A provides a 24V DC voltage to buck converter 618. Output 792B is connected to a 12V regulator and provides a 12 V signal to the logical components of control unit 600. Output 792C is also connected to the 12 V regulator and provides a 12 V signal to the drivers for the H-bridge 608. In one embodiment $R_F$ is about 22 ohms and $C_{BP}$ is about 470 microfarards. Output 792D is connected to a −12V regulator and provides a −12 V signal to the op amps used in control unit 600.

Referring to FIGS. 19A and 19B, two class II power supplies 794 and 796 are provided. In power supply 794 a 12 V voltage regulator provides the 12 V output signal and in combination with a voltage inverter the −12V output signal. In power supply 796 a DC-DC converter provides both a 12 V output and a −12 V output.

Figure 20:
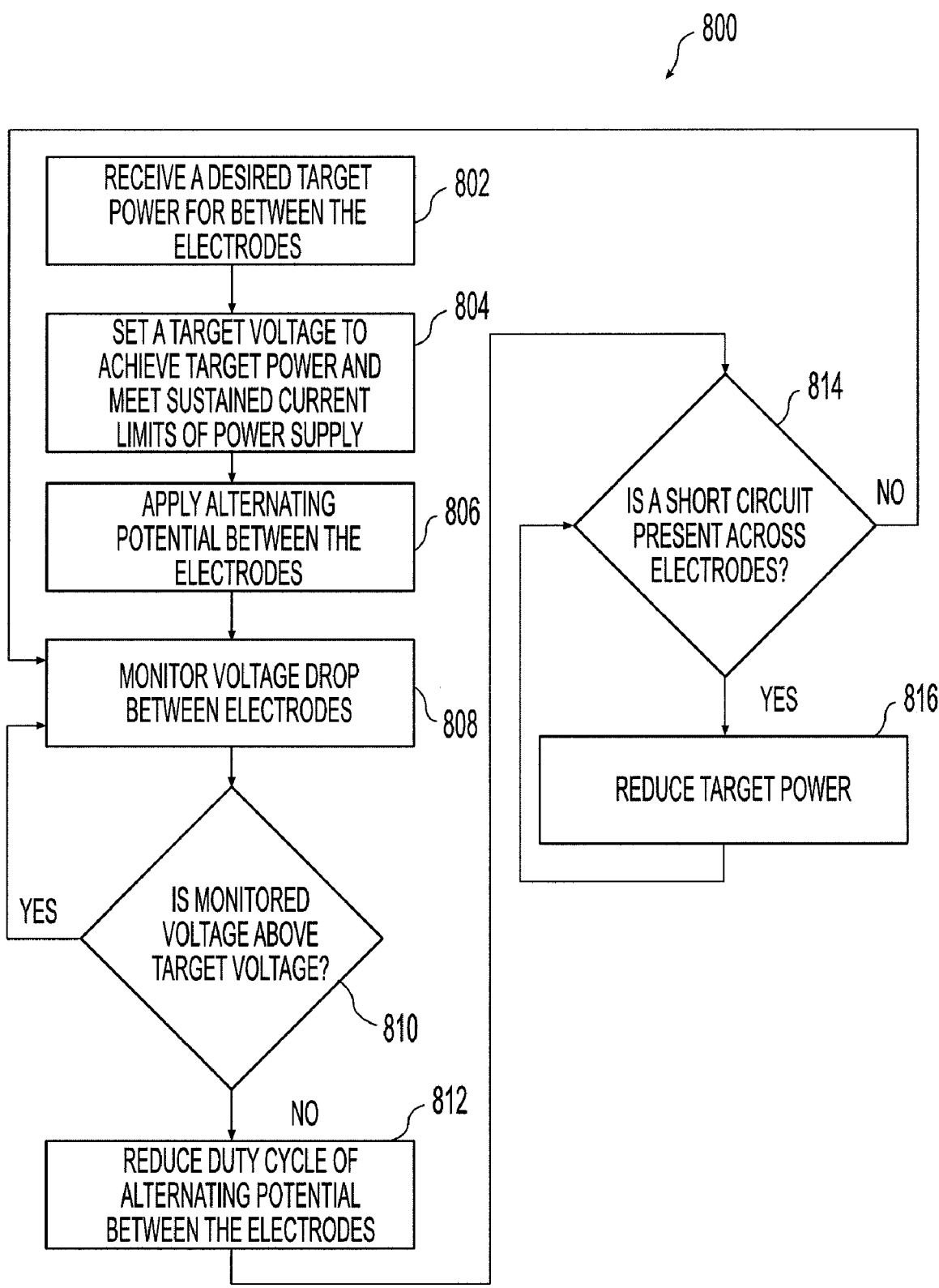
FIG. 20 illustrates an exemplary method of controlling the fluid treatment device of FIG. 8.

As stated earlier, in one embodiment, controller 324 may be implemented in software. An exemplary method 800 executed by the software is shown in FIG. 20. Referring to FIG. 20, a desired target power between electrodes 120A and 120B is received as represented by block 802. A target voltage is set to achieve the desired target power and to meet any sustained current limits of the power supply, as represented by block 804. An alternating voltage is applied between electrodes 120A and 120B, as represented by block 806. The alternating voltage may include any of the characteristics described herein, including a variable frequency and duty cycle. The voltage drop between electrodes 120A and 120B is monitored, as represented by block 808. If the monitored voltage is above the target voltage, control is returned to block 808. If the monitored voltage is not above the target voltage, then a duty cycle of the alternating potential between electrodes 120A and 120B is reduced from 100%, as represented by blocks 810 and 812. A determination is made whether a short circuit condition is present across electrodes 120A and 120B, as represented by block 814. If not, control is returned to block 808. If so, the target power is reduced, as represented by block 816.

Although the invention has been described in detail with reference to certain preferred embodiments, variations and modifications exist within the spirit and scope of the invention as described and defined in the following claims.

The invention claimed is:
1. A fluid treatment device for treating a fluid, comprising:
a conduit having an interior through which the fluid travels;
at least a first electrode and a second electrode placed in direct contact with the fluid within the conduit, each of the first electrode and the second electrode including at least a first fluid directing surface positioned relative to the conduit to redirect the fluid traveling through the conduit away from a wall of the conduit and between the first electrode and the second electrode; and
a control device coupled to the first electrode and the second electrode to provide a potential difference between the first electrode and the second electrode by causing a current to flow through the fluid from one of the first electrode and the second electrode to the other of the first electrode and the second electrode, the control device alternating a flow direction of the current over time, wherein during a first time period current flows from the first electrode through the fluid to the second electrode and during a second time period current flows from the second electrode through the fluid to the first electrode.
2. The fluid treatment device of claim 1, wherein the first electrode and the second electrode each include a main treatment surface coupled to the first fluid directing surface, the main treatment surface of the first electrode being generally parallel to the main treatment surface of the second electrode.

3. The fluid treatment device of claim 1, wherein the conduit is made of a non-metallic material.

4. The fluid treatment device of claim 3, wherein the first electrode and the second electrode are supported by the conduit.

5. A fluid treatment device for treating a water based fluid, comprising:
- a non-conductive pipe through which the water based fluid travels in a first direction along a longitudinal axis of the non-conductive pipe;
- at least a first electrode and a second electrode placed within the non-conductive pipe and in direct contact with the water based fluid, a portion of the first electrode extending through a wall of the non-conductive pipe in a second direction perpendicular to the first direction and a portion of the second electrode extending through the wall in a third direction perpendicular to the first direction;
- a control device coupled to the portion of the first electrode and the portion of the second electrode to provide an alternating potential difference between the first electrode and the second electrode and to monitor a conductivity between the first electrode and the second electrode, wherein at least one characteristic of the alternating potential difference is adjusted by the control device based on an indication of the conductivity between the first electrode and the second electrode.

6. The fluid treatment device of claim 5, wherein the first electrode includes a first generally flat main treatment surface and the second electrode includes a second generally flat main treatment surface, the second generally flat main treatment surface being generally parallel to the first generally flat main treatment surface.

7. The fluid treatment device of claim 6, wherein, the at least one characteristic includes a peak voltage of the alternating potential difference and a duty cycle of the alternating potential difference, wherein in response to an increase in the conductivity between the first electrode and the second electrode the control device first reduces the peak voltage until a threshold peak voltage is reached and subsequently reduces the duty cycle of the alternating potential difference.

* * * * *